US012700143B2

(12) United States Patent
Jin et al.

(10) Patent No.: US 12,700,143 B2
(45) Date of Patent: Aug. 4, 2026

(54) IMAGE COMPRESSION AND TRANSMISSION METHOD AND APPARATUS, ELECTRONIC DEVICE, AND STORAGE MEDIUM

(71) Applicants: Beijing Zitiao Network Technology Co., Ltd., Beijing (CN); Lemon Inc., Grand Cayman (KY)

(72) Inventors: Can Jin, Los Angeles, CA (US); Yongjun Li, Los Angeles, CA (US); Xiaokai Li, Beijing (CN)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/850,863

(22) PCT Filed: Mar. 18, 2023

(86) PCT No.: PCT/CN2023/082367
§ 371 (c)(1),
(2) Date: Sep. 25, 2024

(87) PCT Pub. No.: WO2023/179510
PCT Pub. Date: Sep. 28, 2023

(65) Prior Publication Data
US 2025/0225681 A1     Jul. 10, 2025

(30) Foreign Application Priority Data
Mar. 25, 2022    (CN) .......................... 202210306589.2

(51) Int. Cl.
*G06T 9/20* (2006.01)
*G06T 3/4007* (2024.01)
*G06T 7/10* (2017.01)

(52) U.S. Cl.
CPC .............. *G06T 9/20* (2013.01); *G06T 3/4007* (2013.01); *G06T 7/10* (2017.01)

(58) Field of Classification Search
None
See application file for complete search history.

(56) References Cited

U.S. PATENT DOCUMENTS

2021/0333870 A1 * 10/2021 Wang ................... G06T 3/4038

FOREIGN PATENT DOCUMENTS

| CN | 107317987 A | 11/2017 |
| CN | 108665521 A | 10/2018 |

(Continued)

OTHER PUBLICATIONS

Office action received from Chinese patent application No. 202210306589.2 mailed on Apr. 28, 2026, 15 pages (7 pages English Translation and 8 pages Original Copy).

*Primary Examiner* — Xiaolan Xu

(57) ABSTRACT

Provided an image compression and transmission method and apparatus, an electronic device and a storage medium. An image to be processed is divided into a first area image located at a center of the image and a second area image surrounding an outer side of the first area image, and an inner contour of the second area image is adjacent to the first area image. The second area image is compressed based on compression information to generate a third area image, the compression information indicating a compression mode of the second area image, an inner contour of the third area image is adjacent to the first area image, and a resolution of the third area image is smaller than that of the second area image. A compressed image is generated based on the third area image, and the compressed image is sent to a display unit for displaying.

18 Claims, 10 Drawing Sheets

AP
DDIC

IMAGE TO BE PROCESSED
COMPRESS
IMAGE B
COMPRESSED IMAG
JOIN
IMAGE A IMAGE B
IMAGE A
COMPRESSED IMAG
IMAGE A IMAGE B
RESTORE
IMAGE B
IMAGE C
DISPLAY IMAGE
IMAGE A
JOIN
BUFFER
IMAGE A

(56)     References Cited

FOREIGN PATENT DOCUMENTS

| | | | |
|----|------------|---|---------|
| CN | 109388448  | A | 2/2019  |
| CN | 110855972  | A | 2/2020  |
| CN | 111757090  | A | 10/2020 |
| CN | 112102172  | A | 12/2020 |
| CN | 112468820  | A | 3/2021  |
| CN | 114071150  | A | 2/2022  |

* cited by examiner

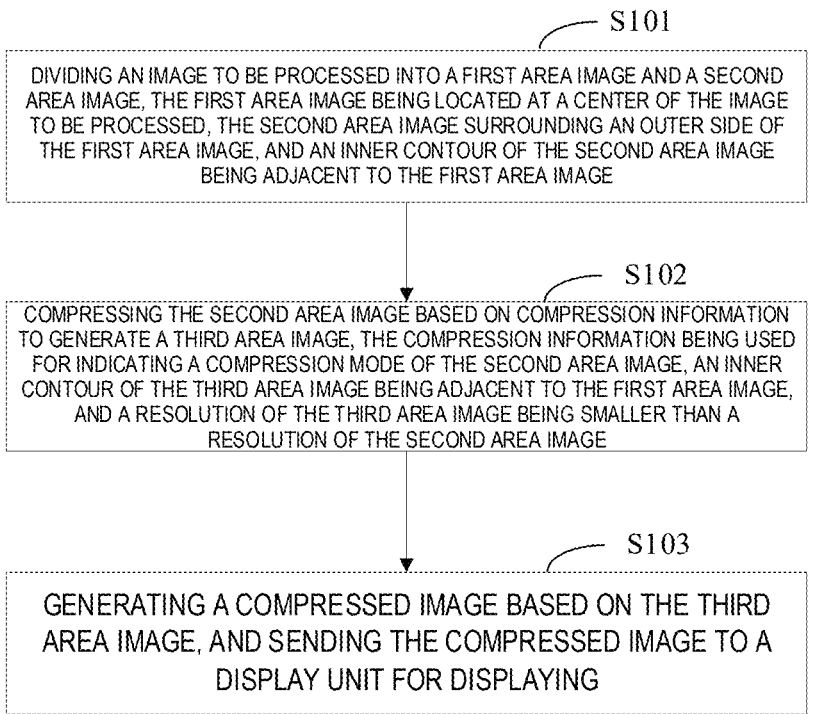

S101

DIVIDING AN IMAGE TO BE PROCESSED INTO A FIRST AREA IMAGE AND A SECOND AREA IMAGE, THE FIRST AREA IMAGE BEING LOCATED AT A CENTER OF THE IMAGE TO BE PROCESSED, THE SECOND AREA IMAGE SURROUNDING AN OUTER SIDE OF THE FIRST AREA IMAGE, AND AN INNER CONTOUR OF THE SECOND AREA IMAGE BEING ADJACENT TO THE FIRST AREA IMAGE

S102

COMPRESSING THE SECOND AREA IMAGE BASED ON COMPRESSION INFORMATION TO GENERATE A THIRD AREA IMAGE, THE COMPRESSION INFORMATION BEING USED FOR INDICATING A COMPRESSION MODE OF THE SECOND AREA IMAGE, AN INNER CONTOUR OF THE THIRD AREA IMAGE BEING ADJACENT TO THE FIRST AREA IMAGE, AND A RESOLUTION OF THE THIRD AREA IMAGE BEING SMALLER THAN A RESOLUTION OF THE SECOND AREA IMAGE

S103

GENERATING A COMPRESSED IMAGE BASED ON THE THIRD AREA IMAGE, AND SENDING THE COMPRESSED IMAGE TO A DISPLAY UNIT FOR DISPLAYING

FIG. 3

IMAGE TO BE PROCESSED

THE FIRST
AREA IMAGE

THE SECOND
AREA IMAGE

S1011

COLLECTING VISUAL INFORMATION, THE VISUAL INFORMATION
REPRESENTING AN ANGLE OF A VISUAL FIXATION ON THE
DISPLAY SCREEN

S1012

DIVIDING THE IMAGE TO BE PROCESSED INTO THE FIRST AREA
IMAGE AND THE SECOND AREA IMAGE BASED ON THE VISUAL
INFORMATION

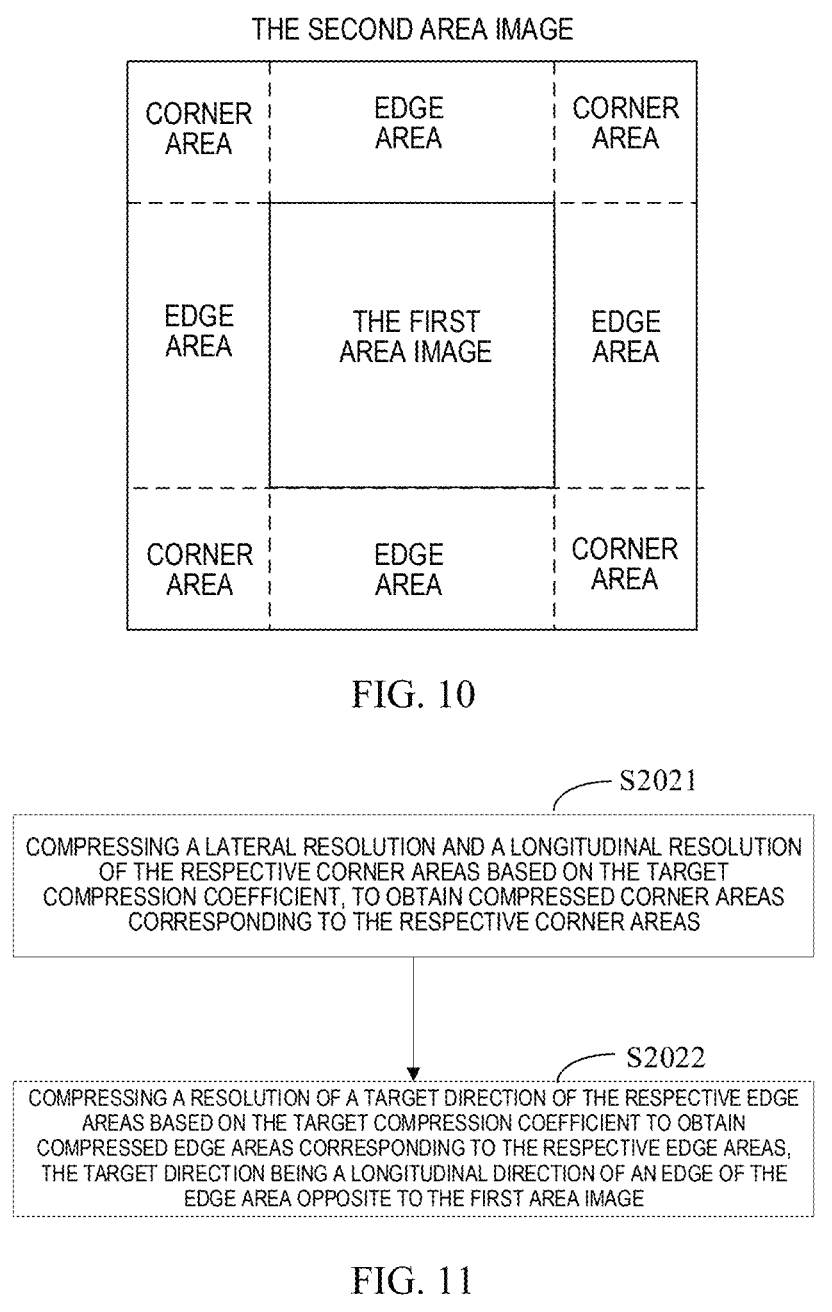

THE SECOND AREA IMAGE

| CORNER AREA | EDGE AREA | CORNER AREA |
|---|---|---|
| EDGE AREA | THE FIRST AREA IMAGE | EDGE AREA |
| CORNER AREA | EDGE AREA | CORNER AREA |

COMPRESSING A LATERAL RESOLUTION AND A LONGITUDINAL RESOLUTION OF THE RESPECTIVE CORNER AREAS BASED ON THE TARGET COMPRESSION COEFFICIENT, TO OBTAIN COMPRESSED CORNER AREAS CORRESPONDING TO THE RESPECTIVE CORNER AREAS

S2022

COMPRESSING A RESOLUTION OF A TARGET DIRECTION OF THE RESPECTIVE EDGE AREAS BASED ON THE TARGET COMPRESSION COEFFICIENT TO OBTAIN COMPRESSED EDGE AREAS CORRESPONDING TO THE RESPECTIVE EDGE AREAS, THE TARGET DIRECTION BEING A LONGITUDINAL DIRECTION OF AN EDGE OF THE EDGE AREA OPPOSITE TO THE FIRST AREA IMAGE

FIG. 11

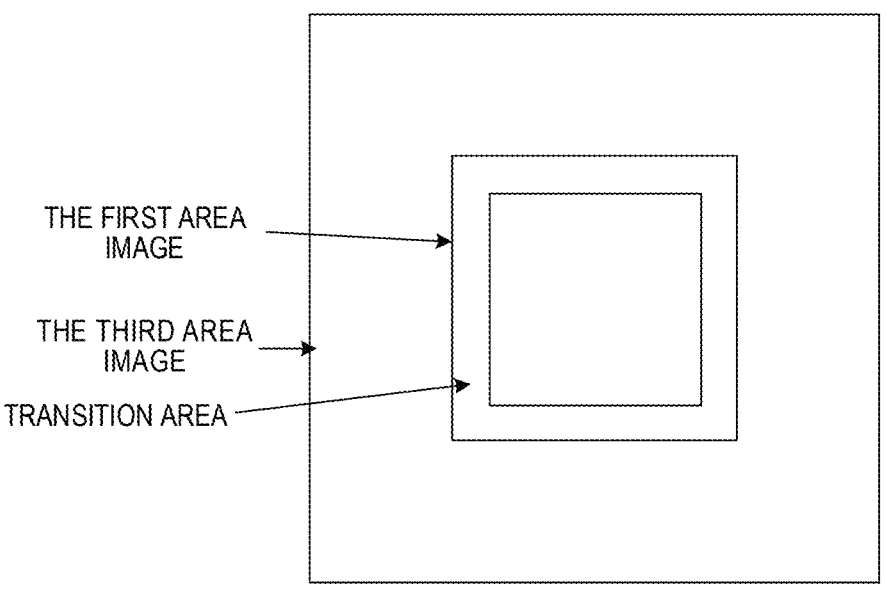

THE FIRST AREA IMAGE

THE THIRD AREA IMAGE

TRANSITION AREA

FIG. 15

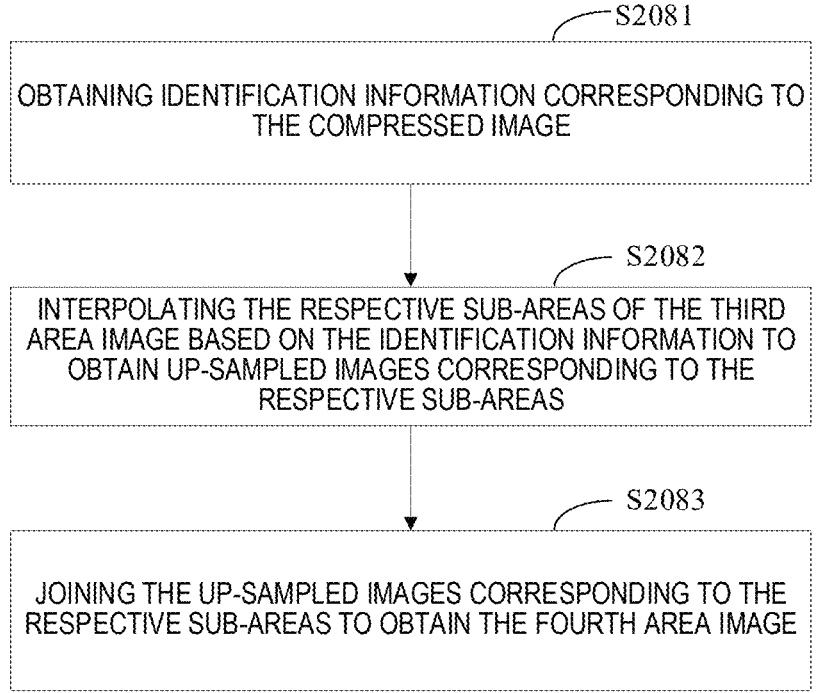

S2081

OBTAINING IDENTIFICATION INFORMATION CORRESPONDING TO THE COMPRESSED IMAGE

S2082

INTERPOLATING THE RESPECTIVE SUB-AREAS OF THE THIRD AREA IMAGE BASED ON THE IDENTIFICATION INFORMATION TO OBTAIN UP-SAMPLED IMAGES CORRESPONDING TO THE RESPECTIVE SUB-AREAS

S2083

JOINING THE UP-SAMPLED IMAGES CORRESPONDING TO THE RESPECTIVE SUB-AREAS TO OBTAIN THE FOURTH AREA IMAGE

FIG. 16

IMAGE COMPRESSION AND TRANSMISSION METHOD AND APPARATUS, ELECTRONIC DEVICE, AND STORAGE MEDIUM

CROSS REFERENCE

This disclosure claims priority to Chinese Patent Application No. 202210306589.2, filed with the Chinese Patent Office on Mar. 25, 2022 and entitled "IMAGE COMPRESSION AND TRANSMISSION METHOD AND APPARATUS, ELECTRONIC DEVICE, AND STORAGE MEDIUM", which is incorporated herein by reference in its entirety.

FIELD

Embodiments of the present disclosure relate to the field of image processing technologies, and in particular, to an image compression and transmission method and apparatus, an electronic device, a storage medium, a computer program product, and a computer program.

BACKGROUND

In the technical implementations of virtual reality and mediated reality (MR), a high-resolution display system is an indispensable factor, such as, a high-resolution VR/MR head display device. The display system comprises an application processor (AP) and a display driver integrated circuit (DDIC). The original image data, after being received and processed by the AP, needs to be sent to the DDIC for display. Therefore, a transmission path between the AP and the DDIC needs extremely large bandwidth to implement large-scale data transmission, which accordingly brings about greater power consumption.

In the prior art, in order to reduce power consumption and bandwidth load, in the case where a system can provide eye movement tracking, the characteristics of a human vision system may be used to perform dynamic re-sampling on an image to be transmitted, so as to reduce the transmission resolution in the current peripheral vision of a user, thereby achieving the purpose of reducing transmission bandwidth without vision lossless, to reduce power consumption.

However, a solution for compressing and transmitting image data in the prior art has the problems of low compression efficiency and large display delay after the DDIC receives the image data.

SUMMARY

Embodiments of the present disclosure provide an image compression and transmission method and apparatus, an electronic device, a storage medium, a computer program product, and a computer program, to overcome the problems in the prior art of low compression efficiency and large display delay after a DDIC receives image data.

According to a first aspect, an embodiment of the present disclosure provides a method for image compression and transmission, comprising:

dividing an image to be processed into a first area image and a second area image, the first area image being located at a center of the image to be processed, the second area image surrounding an outer side of the first area image, and an inner contour of the second area image being adjacent to the first area image;

compressing the second area image based on compression information to generate a third area image, the compression information being used for indicating a compression mode of the second area image, an inner contour of the third area image being adjacent to the first area image, and a resolution of the third area image being smaller than a resolution of the second area image; and generating a compressed image based on the third area image, and sending the compressed image to a display unit for displaying.

According to a second aspect, an embodiment of the present disclosure provides an apparatus for image compression and transmission, comprising:

a dividing module configured to divide an image to be processed into a first area image and a second area image, the first area image being located at a center of the image to be processed, the second area image surrounding an outer side of the first area image, and an inner contour of the second area image meeting the first area image;

a generation module configured to compress the second area image based on compression information to generate a third area image, the compression information being used for indicating a compression mode of the second area image, an inner contour of the third area image meeting the first area image, and a resolution of the third area image being smaller than the resolution of the second area image; and a joining module configured to generate a compressed image based on the third area image, and sending the compressed image to a display unit for displaying.

According to a third aspect, an embodiment of the present disclosure provides an electronic device, comprising:

a processor, and a memory communicatively connected with the processor;

the memory storing a computer executable instruction; and the processor executing the computer executable instruction stored in the memory to implement the image compression and transmission method of above first aspect and various possible designs thereof.

According to a fourth aspect, an embodiment of the present disclosure provides a computer readable storage medium storing a computer executable instruction, the computer executable instruction, when executed by a processor, implementing a method for image compression and transmission of above first aspect and various possible designs thereof.

According to a fifth aspect, an embodiment of the present disclosure provides a computer program product, comprising a computer program, the computer program, when executed by a processor, implementing a method for image compression and transmission of above first aspect and various possible designs thereof.

According to a sixth aspect, an embodiment of the present disclosure provides a computer program, the computer program, when executed by a processor, implementing a method for image compression and transmission method of above first aspect and various possible designs thereof.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, other drawings may also be obtained by the skilled person according to these drawings without creative efforts.

FIG. 3 is a first schematic flowchart of a method for image compression and transmission according to an embodiment of the present disclosure;

FIG. 10 is a schematic diagram of the second area image according to an embodiment of the present disclosure;

FIG. 11 is a flowchart of a specific implementation of step S202 in the embodiment shown in FIG. 9;

FIG. 15 is a schematic diagram of a transition area according to an embodiment of the present disclosure;

FIG. 16 is a flowchart of a specific implementation of step S208 in the embodiment shown in FIG. 9;

DETAILED DESCRIPTION

In order to make objects, technical solutions and advantages of the embodiments of the present disclosure more apparent, the technical solutions in the embodiments of the present disclosure will be described below in a clearly and fully understandable way in connection with the drawings related to the embodiments of the present disclosure. Obviously, the described embodiments are only a part but not all of the embodiments of the present disclosure. All other embodiments obtained by persons of ordinary skill in the art based on the embodiments of the present disclosure without creative efforts shall belong to the scope of protection of the present disclosure.

Figure 1:
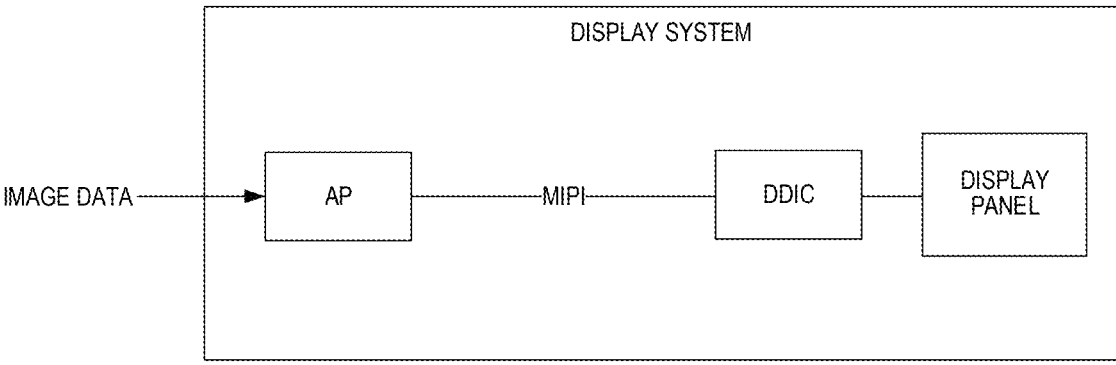
FIG. 1 is a structural diagram of a display system according to an embodiment of the present disclosure.

Application scenarios of the embodiments of the present disclosure will be explained below:

FIG. 1 is a structural diagram of a display system provided in an embodiment of the present disclosure. As shown in FIG. 1, the display system comprises an application processor (shown as AP in the figure), a display driver integrated circuit (shown as DDIC in the figure), and a mobile industry processor interface (shown as MIPI in the figure) connecting the AP and the DDIC. In an application scenario of virtual reality or mediated reality, the foregoing display system may be disposed in a terminal device such as a VR/MR head display. After original image data is input through an external data interface of a head display terminal device, the image data is received by an application processor, and after being processed, the data is sent to a DDIC. The DDIC drives a display panel to display an image based on the image data, thereby completing high resolution image display in a VR/MR scenario. The foregoing terminal device or display system may apply the image compression and transmission method provided in the embodiments of the present disclosure to compress and transmit image data.

Figure 2:
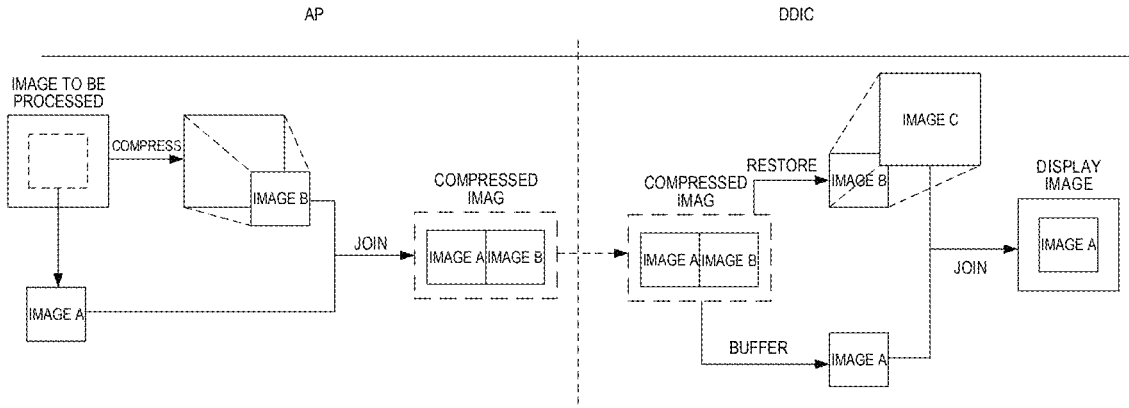
FIG. 2 is a schematic diagram of image compression and transmission in the prior art.

In the prior art, in order to reduce power consumption and bandwidth load, in the case where a system can provide eye movement tracking, the characteristics of a human vision system can be used to compress an image to be transmitted (dynamic resampling), so as to reduce the transmission resolution in the current peripheral vision of a user, thereby achieving the purpose of reducing transmission bandwidth without vision lossless, to reduce power consumption. FIG. 2 is a schematic diagram of image compression and transmission in the prior art. As shown in FIG. 2, after obtaining image data, AP extracts a high-resolution central area image (namely, an image A) corresponding to a visual fixation area from an image to be processed based on a human eye tracking algorithm. Then, the image to be processed is compressed (down-sampling) to generate a low-resolution compressed image (namely, an image B) having the same pixel size (the same pixel size in at least one direction) as that of the central area image. The image A and the image B are joined into a frame of compressed image for data transmission, and the compressed image is sent to the DDIC end for decompression. After obtaining the described compressed image, the DDIC end needs to firstly cache the image A with a high resolution, and at the same time or after that, restore (up-sampling) the image B with a low resolution to obtain a restored high-resolution image C. The cached image A and image C are joined to obtain a display image with a (real) high resolution in the central area and a (real) low resolution in the marginal area is obtained, and the display image is displayed by a display driven by the DDIC.

Based on an image compression and transmission scheme in the prior art, during a compression process, a central area image of an image actually needs not to be compressed. However, in the solution of the prior art, in order to ensure that a low-resolution compressed image (namely, the image B in above image) generated after compression matches the size of an uncompressed high-resolution central area image (so that a frame of transmission data can be synthesized for subsequent transmission to a DDIC end), the proportion of high-resolution area and low-resolution area is limited, and the size of each area cannot be configured flexibly. In addition, in some systems, the data transmission process is that the pixels are transmitted row by row to the DDIC and further displayed row by row by driven display unit. In this manner, the relative positions of pixels in each row are changed, that is, the first row of the low-resolution area is behind the last row of the high-resolution area. The rowby-row refresh of the display unit may be initiated only after the high resolution area transmission is completed and stored in the DDIC memory. This causes additional time consumption and requires a large amount of memory to be reserved in the DDIC. In addition, since the low resolution compressed image comprises some invalid data (the central area image with low resolution), the data amount of compressed image is increased, and the network transmission load is increased. Accordingly, when image is restored subsequently at a DDIC, for the same reason, additional computing resources may also be consumed, finally causing an increase in image display delay.

An embodiment of the present disclosure provides a method for image compression and transmission to solve the described problem.

Reference now is made to FIG. 3, which is a first schematic flowchart of the method for image compression and transmission according to an embodiment of the present disclosure. The method in this embodiment may be applied at a terminal device, such as a VR/MR helmet and VR/MR glasses. The metho for image compression and transmission comprises:

Step S101: dividing an image to be processed into a first area image and a second area image, the first area image being located at a center of the image to be processed, the second area image surrounding an outer side of the first area image, and an inner contour of the second area image being adjacent to the first area image.

For example, the image to be processed is data input into the terminal device through a data interface of the terminal device, and may be an original virtual image (namely, a virtual image generated by other devices in the VR scenario) or a synthetic image (namely, an image generated by fusing a real image and a virtual image by other devices in the MR scenario) generated by other device, such as a computer. Further, the image to be processed may be an image with a high resolution, and may be received by an application chip (AP) in the terminal device, and is divided to generate the first area image and the second area image.

Figure 4:
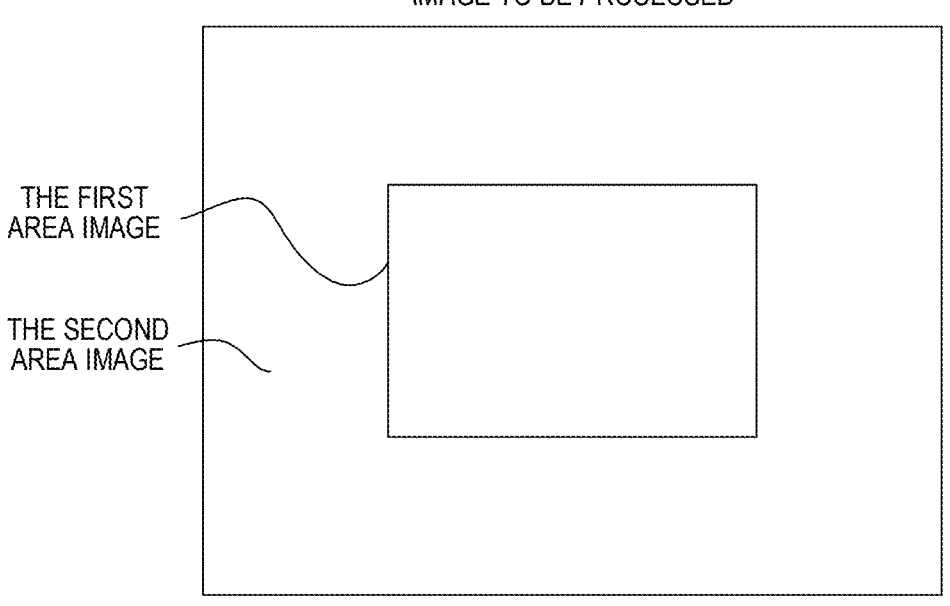
FIG. 4 is a schematic diagram of division of an image to be processed according to an embodiment of the present disclosure.
Figure 5:
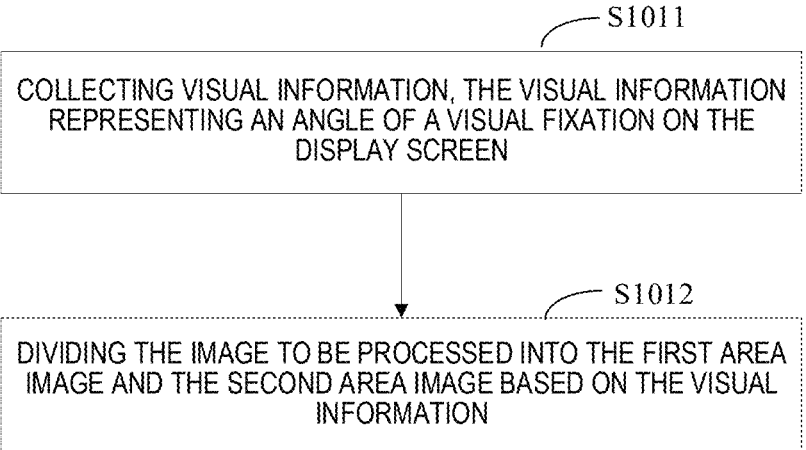
FIG. 5 is a flowchart of specific implementation of step S101 in the embodiment shown in FIG. 3.

FIG. 4 is a schematic diagram of division of an image to be processed provided in an embodiment of the present disclosure. As shown in FIG. 4, the first area image is located at a center of the image to be processed and corresponds to a visual fixation point of a user on the image; the second area image surrounds an outer side of the first area image and corresponds to a non-fixation point of the image. A union set of the first area image and the second area image is the image to be processed. There are various methods for dividing the image to be processed. For example, based on a predetermined dividing coefficient, the size of the first area image of the image to be processed is determined, so as to divide the image to be processed into the first area image and the second area image. As another example, the division of the first area image and the second area image is implemented based on the positioning of the first area image by an eye movement tracking algorithm. As shown in FIG. 5, for example, the specific implementation of step S101 comprise:

Step S1011: collecting visual information, the visual information representing an angle of a visual fixation on the display screen.

Step S1012: dividing the image to be processed into the first area image and the second area image based on the visual information.

As an example, a terminal device has a display screen. Specifically, the terminal device is, for example, a VR headset. The VR headset can provide an eye movement tracking capability for a user who wears it, that is, collecting, by a sensor, visual information that represents an angle of a visual fixation on the display screen. A method for collecting an angle of a visual fixation on the display screen is a prior art known to a person skilled in the art, and details are not repeated herein.

Further, after visual information is obtained, processing is performed based on the visual information, so that the position of a visual fixation point on an image to be processed may be determined, and then the position of a first area image corresponding to the visual fixation point is determined.

Specifically, in a possible implementation, based on the visual information, an implementation of dividing the image to be processed into the first area image and the second area image comprises:

determining fixation point information according to the visual information, the fixation point information representing mapping coordinates of a visual fixation point on a screen; determining coordinates of the first area image in the image to be processed according to the fixation point information and a pixel size of the image to be processed; and dividing the image to be processed into the first area image and the second area image based on the coordinates of the first area image.

Where a device parameter (for example, a screen size) of a terminal device is determined, there is a determined mapping relationship between visual information and fixation point information. By determining mapping coordinates of a visual fixation point on a screen, and based on a pixel size of an image to be processed, a target area corresponding to the visual fixation point in the image to be processed may be determined. Because the visual fixation point is generally located at the center of the image to be processed, the above process may be understood as a process of determining the range of the target area. Further, a pixel point set of the target area is taken as the first area image, and a pixel point set of other areas in the image to be processed is taken as the second area image, so that division of the first area image and the second area image may be realized. In this embodiment, dynamic positioning is completed on a first area image of the image to be processed by visual information and a pixel size of the image to be processed, thereby implementing dynamic division on the image to be processed, and improving an image display effect in a subsequent image display process.

Step S102: compressing the second area image based on compression information to generate a third area image, the compression information being used for indicating a compression mode of the second area image, an inner contour of the third area image being adjacent to the first area image, and a resolution of the third area image being smaller than a resolution of the second area image.

For example, after the image to be processed is divided into the first area image and the second area image, the second area image is compressed, because it corresponds to the non-vision fixation point and may not affect the impressions of the user even if with low resolution. In such a way, the data transmission volume may be reduced, and the real-time performance of image display is improved. Specifically, down-sampling is performed on the second area image to reduce the resolution of the second area image, that is, to reduce the pixel per inch (PPI) of the second area image. The specific compression mode thereof is determined by compression information. For example, the compression information comprises a compression coefficient, and the compression coefficient represents a compression ratio of the resolution. Thus, a third area image having a even lower resolution is generated. In subsequent steps, the compressed third area image and the first area image need to be joined together to form a complete frame of image for data transmission, thus it is necessary to ensure the size of the third area image and that of the first area image are matched, i.e., the inner contour of the third area image is adjacent to the first area image.

Figure 6:
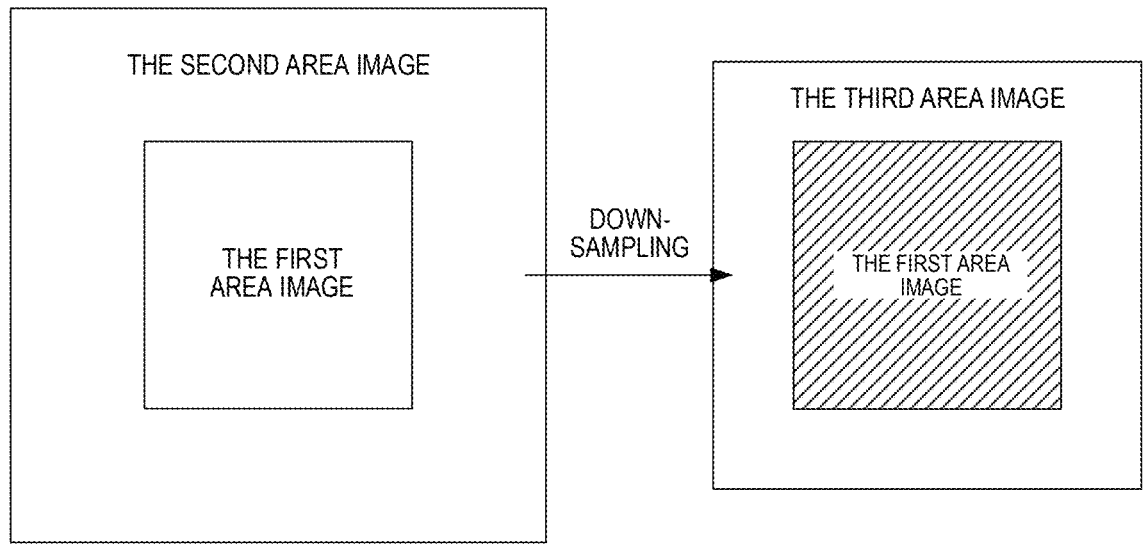
FIG. 6 is a schematic diagram of a process of generating the third area image according to an embodiment of the present disclosure.

FIG. 6 is a schematic diagram of a process for generating a third area image according to an embodiment of the present disclosure. As shown in FIG. 6, both the image to be processed and the first area image have a square outline, and the second area image has a rectangular ring outline. A low-resolution third area image may be obtained by down-sampling the second area image. The second area image and the third area image may be realized by a pixel matrix, and a blank areas inside the second area image and the third area image may be filled by sparse matrixes. Compared with an image obtained by directly compressing an image to be processed, the image has a smaller volume and consumes less time.

In a possible implementation, the second area image comprises an inner layer area and an outer layer area, wherein an inner contour of the inner layer area is adjacent to the first area image, and an outer contour of the inner layer area is adjacent to an inner contour of the outer layer area; the compression information comprises a first compression coefficient corresponding to the inner layer area and a second compression coefficient corresponding to the outer layer area.

Figure 7:
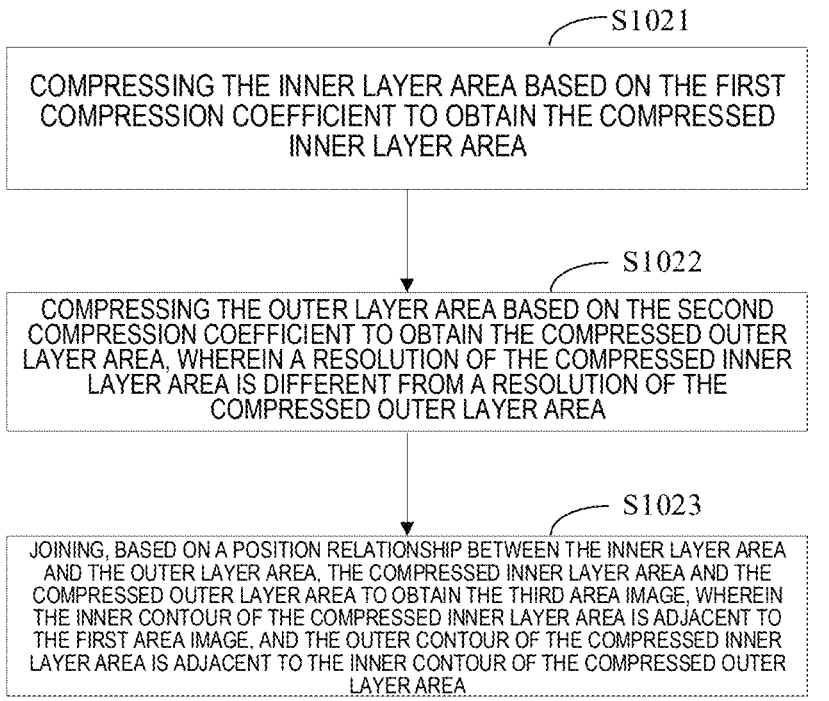
FIG. 7 is a flowchart of specific implementation of step S102 in the embodiment shown in FIG. 3.

As shown in FIG. 7, the specific implementation of step S102 comprises:

Step S1021: compressing the inner layer area based on the first compression coefficient to obtain the compressed inner layer area.

Step S1022: compressing the outer layer area based on the second compression coefficient to obtain the compressed outer layer area, wherein a resolution of the compressed inner layer area is different from a resolution of the compressed outer layer area.

Step S1023: joining, based on a position relationship between the inner layer area and the outer layer area, the compressed inner layer area and the compressed outer layer area to obtain the third area image, wherein the inner contour of the compressed inner layer area is adjacent to the first area image, and the outer contour of the compressed inner layer area is adjacent to the inner contour of the compressed outer layer area.

In another possible implementation, specific implementation of step S102 comprises:

Step S1024: reading pixel points of the image to be processed line by line to obtain line pixel sequences.

Step S1025: compressing pixel points corresponding to the second area image in respective line pixel sequences based on the compression information, to obtain the third area image.

For example, in the steps provided in this embodiment, the process of dividing the image to be processed to obtain the first area image and the second area image refers to dividing pixels of image coordinates. That is, a pixel coordinate range of the first area image and pixel point coordinates of the second area image are determined, rather than generating image data that needs to be independently cached. Therefore, the process of compressing the second area image is: on the basis of the image to be processed, compressing pixel points corresponding to the second area image line by line, for example, down-sampling, i.e., extracting pixels at equal intervals per columns, so as to obtain a low-resolution third area image. It should be noted that the first area image and the second area image are differentiated according to pixel coordinates, therefore, the first area image and the second area image are a part of the image to be processed. By the way of reading and compressing the image to be processed line by line provided in this embodiment, a third area image obtained by compressing the second area image in the image to be processed is a compressed image, without requiring additional joining process.

In the steps of the present embodiment, the image to be processed may enter a processing unit (AP) line by line, and a first area image and a second area image do not need to be specifically generated and joined, but pixel coordinates of each partition are pre-defined. When a pixel in the current line is processed, only the partition in which the pixel is located needs to be determined according to the coordinates of the current pixel, and the compression ratio of the current partition needs to be searched for and compressed. Since the arrangement of the partitions will not change the order of the pixel lines, the current line may be directly output line by line after being processed, and it is unnecessary to be output after the whole frame of picture being processed. In addition, a transmission order of each line of pixels is unchanged in this implementation, thus a delay and a memory requirement possibly caused by the manner of splitting an input image and successively transmitting the input image are avoided, meanwhile the overall resolution of a generated compressed image is reduced to reduce the data amount that needs to be transmitted.

When down-sampling is performed on a partition, filtering processing needs to be performed on input content, to improve image quality degradation caused by aliasing. When filtering is implemented, a configurable filtering kernel may be used. In the implementation of line by line processing, several lines of input pixels need to be temporarily stored, because pixel information of several adjacent lines needs to be read in a filtering operation. However, this operation does not bring about the delay and memory requirement of the entire frame, but only the delay and memory requirement of several lines of pixels.

Figure 8:
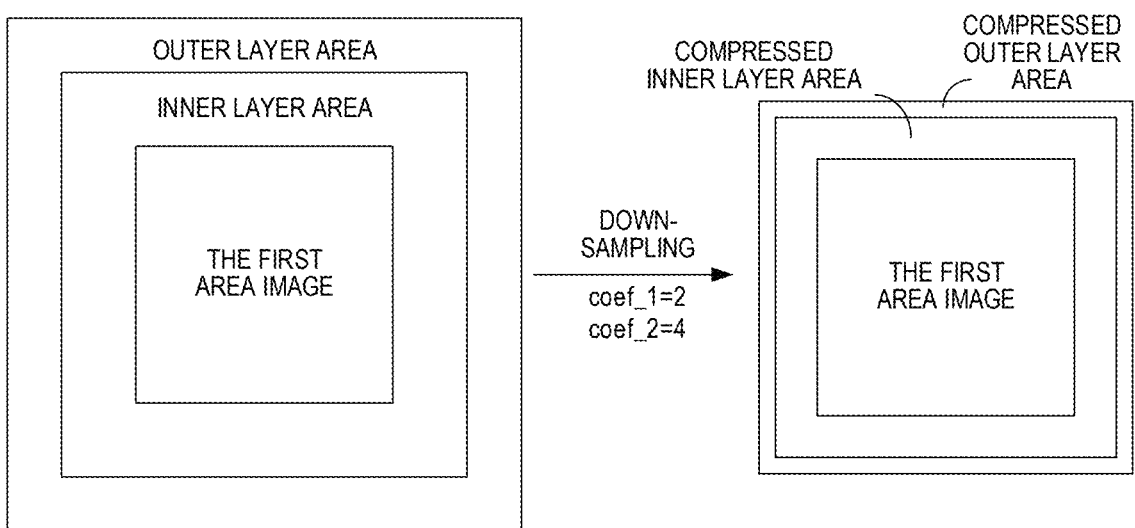
FIG. 8 is a schematic diagram of another process for generating the third area image according to an embodiment of the present disclosure.

FIG. 8 is a schematic diagram of another process for generating the third area image according to an embodiment of the present disclosure. As shown in FIG. 8, both the image to be processed and the first area image have a square outline, and the second area image comprises an inner area and an outer area, the inner layer region and the outer layer region are nested adjacently. In the process of compressing the second area image, down-sampling are performed respectively based on a first compression coefficient and a second compression coefficient corresponding to the inner layer area and the outer layer area. Specifically, for example, the first compression coefficient coef_1=2, and a second compression coefficient coef_2=4. That is, after the inner layer area is compressed, the obtained resolution of the compressed inner layer area is ½ of that of the inner layer area; after the outer layer area is compressed, the obtained resolution of the compressed outer layer area is ¼ of that of the outer layer area. The inner layer area and the outer layer area of the second area image may be generated directly when the first area image and the second area image are divided, or may be generated by further dividing the second area image after the first area image and the second area image are divided. The division of the outer layer area and the inner layer area in the second area image may be determined based on predetermined configuration information, which is not specifically limited herein.

Further, while the compression is performed, it needs to be ensured that a pixel size of the compressed third area image is matched with that of the first area image. That is, the first area image and the third area image may be joined into a complete frame of image. Therefore, after the compressed inner layer area and the compressed outer layer area are generated, the compressed inner layer area and the compressed outer layer area are joined based on the positional relationship between the inner layer area and the outer layer area. The inner contour of the compressed inner layer area is adjacent to the first area image, and the outer contour of the compressed inner layer area is adjacent to the inner contour of the compressed outer layer area.

For example, the inner layer area and the outer layer area of the second area image may further comprise a plurality of sub-areas. The first compression coefficient and the second compression coefficient are an array structure, and the first compression coefficient and the second compression coefficient respectively comprise sub-coefficients corresponding to the number of sub-areas. As an example, the inner layer area A of the second area image includes inner layer sub-areas (A1, A2, A3), and the outer layer area B includes outer layer sub-areas (B1, B2, B3). The inner layer sub-areas (A1, A2, A3) and the outer layer sub-areas (B1, B2, B3) are nested and connected in sequence, and the union of the inner layer sub-areas (A1, A2, A3) and the outer layer sub-areas (B1, B2, B3) is the second area image.

The inner layer sub-areas (A1, A2, A3) respectively correspond to sub-coefficients (coef_11, coef_12, coef_13) in the first compression coefficient, i.e., the inner layer sub-area A1 is down-sampled with the compression coefficient coef_11, the inner layer sub-area A2 is down-sampled with the compression coefficient coef_12, and the inner layer sub-area A3 is down-sampled with the compression coefficient coef_13. Therefore, the compressed inner layer sub-areas (rA1, rA2, rA3) respectively corresponding to the inner layer sub-areas (A1, A2, A3) are generated, and the compressed inner layer sub-areas (rA1, rA2, rA3) are nested and connected in sequence. The union of the compressed inner layer sub-areas (rA1, rA2, rA3) is the compressed inner layer area.

The outer layer sub-areas (B1, B2, B3) are compressed based on different compression sub-coefficients to obtain corresponding compressed outer layer sub-areas (rB1, rB2, rB3). The process is similar and will not be repeated herein.

In this embodiment, the second area image is compressed by layer to obtain a final compressed image with resolution changing based on sub-areas of the second area image. For example, the farther a sub-area is away from the first area image, the lower the resolution is. Therefore, more flexible image compression is achieved, an image compression rate is improved, and image display delay is reduced.

Step S103: generating a compressed image based on the third area image, and sending the compressed image to a display unit for displaying.

For example, in a possible implementation, the compressed image may be generated by joining the first area image and the third area image. Specifically, after the third area image is obtained, the inner contour of the third area image is adjacent to the outer contour of the first area image. Therefore, a complete frame of image, i.e., a compressed image, is obtained by joining the inner contour of the third area image and the outer contour of the first area image. Compared with an original image to be processed, the compressed image reserves a high-resolution image (a first area image) corresponding to a visual fixation point, and at the same time, an image (a second area image) corresponding to a non-visual fixation point is compressed, so as to achieve the purpose of reducing a transmission bandwidth without vision loss. Then, the compressed image is sent to a display unit, such as a display driver integrated circuit (DDIC). The display unit restores the compressed image, interpolates the previous compressed image, i.e., the third area image, increases (displays) the resolution to the extent of matching with the display screen of the terminal device, and displays same, thereby achieving the purpose of image display based on visual tracking in the VR/MR scenario. A specific implementation for performing interpolation an restoring on an image by a display unit and driving a display screen to render image is a prior art known to a person skilled in the art, and is not described herein again.

In the embodiment, dividing an image to be processed into a first area image and a second area image, the first area image being located at a center of the image to be processed, the second area image surrounding an outer side of the first area image, and an inner contour of the second area image being adjacent to the first area image; compressing the second area image based on compression information to generate a third area image, the compression information being used for indicating a compression mode of the second area image, an inner contour of the third area image being adjacent to the first area image, and a resolution of the third area image being smaller than a resolution of the second area image; and generating a compressed image based on the third area image, and sending the compressed image to a display unit for displaying. Because a image to be process is divided into a first area image and a second area image, and only the second area image is compressed to form a compressed image, thereby avoiding time consumption of an invalid compression process, reducing a volume of a generated compressed image, and reducing an image display delay.

Figure 9:
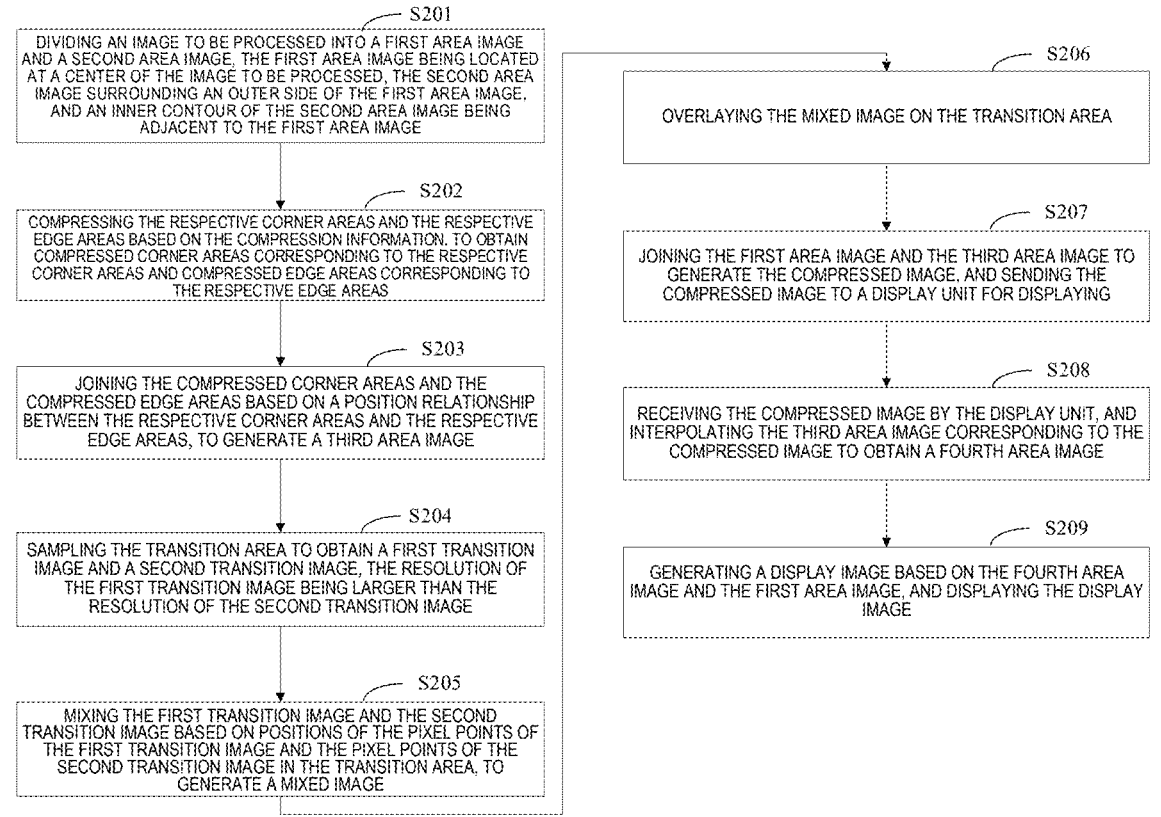
FIG. 9 is a second flowchart of a method for image compression and transmission according to an embodiment of the present disclosure.

Referring to FIG. 9, FIG. 9 is a second flowchart of the method for image compression and transmission according to an embodiment of the present disclosure. On the basis of the embodiment shown in FIG. 3, this embodiment introduces steps of generating a third area image in detail, and adds a step of processing a compressed image by a display unit. The method for image compression and transmission comprises:

Step S201: dividing an image to be processed into a first area image and a second area image, the first area image being located at a center of the image to be processed, the second area image surrounding an outer side of the first area image, and an inner contour of the second area image being adjacent to the first area image.

As an example, the first area image is a rectangle, the second area image comprises four corner areas and at least four edge areas, the four corner areas and the at least four edge areas surround the first area image and are adjacent to the first area image respectively.

FIG. 10 is a schematic diagram of a second area image according to an embodiment of the present disclosure. As shown in FIG. 10, the second area image comprises four corner areas respectively located at four corners of the first area image and four edge areas respectively located at four edges of the first area image. The four corner areas and the four edge areas are connected end to end to form a annular second area image. In this embodiment, the second area image is divided into a plurality of rectangular sub-areas. The second area image may be compressed by compressing (down-sampling) respective rectangular sub-areas, without processing operations such as zero padding on a central blank area of a second area image. In this way, the compression process consumes less time, and the volume of the third area image generated after compression is also smaller.

Certainly, in another possible implementation, there may be more than four edge areas, for example, eight edge areas, that is, each edge area in FIG. 10 is divided into two edge areas. The corresponding processing process is similar to the process of processing the second area image in the embodiment shown in FIG. 10, and is not repeated herein.

Step S202: compressing the respective corner areas and the respective edge areas based on the compression information, to obtain compressed corner areas corresponding to the respective corner areas and compressed edge areas corresponding to the respective edge areas.

For example, after the second area image is divided into a plurality of sub-areas, there are a plurality of compression manners for compressing the respective sub-areas. For example, respective sub-areas of the second area image may be compressed by using a common compression coefficient, or respective sub-areas of the second area image may be compressed by using a plurality of different compression coefficients. The specific compression manner may be determined by the compression information. Further, the compression information may be predetermined, or may be determined based on a pixel size of the image to be processed, which is not described herein again.

In a possible implementation, the compression information comprises a target compression coefficient, and the target compression coefficient represents a resolution compression ratio. As shown in FIG. 11, a possible implementation of step S202 comprises:

Step S2021: compressing a lateral resolution and a longitudinal resolution of the respective corner areas based on the target compression coefficient, to obtain compressed corner areas corresponding to the respective corner areas.

Step S2022: compressing a resolution of a target direction of the respective edge areas based on the target compression coefficient to obtain compressed edge areas corresponding to the respective edge areas, the target direction being a longitudinal direction of an edge of the edge area opposite to the first area image.

For example, on the premise that the second area image is ensured to surround the first area image and the first area image and the second area image may be joined into a complete frame of image, there is a certain restrictive position relationship among the four corner areas, four edge areas in the second area image and the first area image. For example, the corner areas are respectively adjacent to a lateral edge area and a longitudinal edge area, and the lateral pixel size of the lateral edge area is the same as the lateral pixel size of the first area image; the longitudinal pixel size of the longitudinal edge area is the same as the longitudinal pixel size of the first area image, and so on. Based on the described restrictive position relationship, when four corner areas and four edge areas are compressed, the lateral resolution and the longitudinal resolution of the corner areas are simultaneously compressed, and only the resolution in the target direction of the edge areas is compressed.

Figure 12:
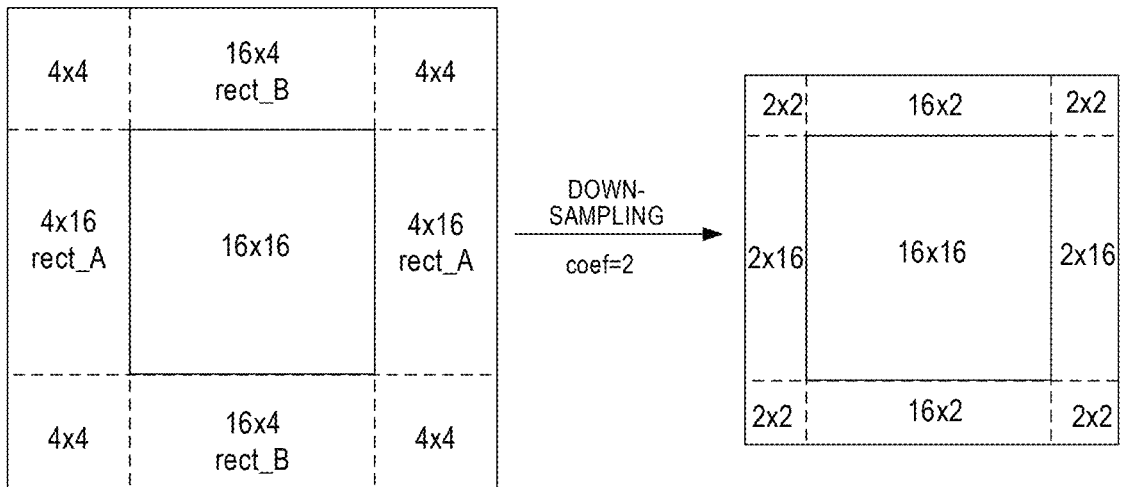
FIG. 12 is a schematic diagram of compressing the second area image according to an embodiment of the present disclosure.

For example, FIG. 12 is a schematic diagram of compressing a second area image according to an embodiment of the present disclosure. As shown in FIG. 12, the second area image comprises four corner areas having a pixel size of 4×4, two edge areas of 4×16 (longitudinal edge areas, shown as rect_A in the figure), and two edge areas of 16×4 (lateral edge areas, shown as rect_B in the figure), in which four corner areas and four edge areas surround the first area image with a pixel size of 16×16, the target compression coefficient is, for example, coef=2. Here, the corner areas and the edge areas are down-sampled. The pixel size corresponding to the target directions of rect_A and rect_B is 4. After being compressed, the pixel sizes of the compressed corner areas corresponding to the four corner areas are 2×2, that is, both the lateral resolution and the longitudinal resolution of the corner areas are compressed. In specific implementation, the corner area is filtered in two directions. The pixel size of the compressed corner area of the rect_A is 2×16, and the pixel size of the compressed corner area of the rect_B is 16×2, that is, only the resolution in the target direction of the edge area is compressed. In specific implementation, the edge area is filtered in the target direction. In the step of this embodiment, the respective sub-area of the second area image is compressed based on a unified target compression coefficient. Therefore, in a decompression process, the image restoration may be completed based on a same decompression coefficient, and no partitioned processing is used, the recovery speed is high. At the same time, the compression ratios of the second area image in various directions are the same, and the compression is balanced, so that when an image is displayed after being restored, the image in a low resolution area is more natural, thereby reducing distortion.

Figure 13:
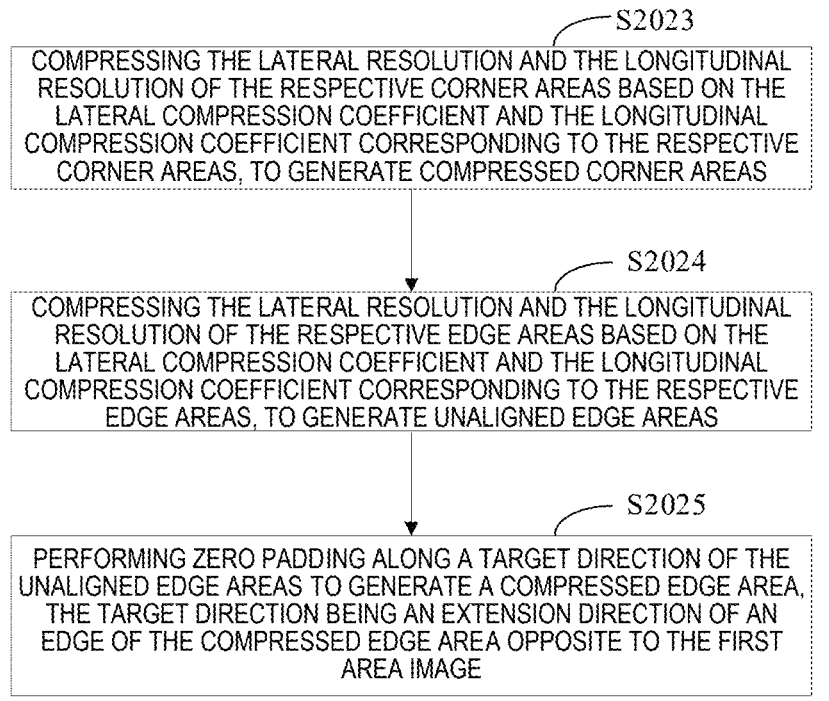
FIG. 13 is a flowchart of specific implementation of step S202 in the embodiment shown in FIG. 9.

Optionally, the compression information comprises at least two target compression arrays, and the target compression arrays comprise a lateral compression coefficient and a longitudinal compression coefficient, the lateral compression coefficient represents a lateral resolution compression ratio, and the longitudinal compression coefficient represents a longitudinal resolution compression ratio. As shown in FIG. 13, another possible implementation of step S202 comprises:

Step S2023: compressing the lateral resolution and the longitudinal resolution of the respective corner areas based on the lateral compression coefficient and the longitudinal compression coefficient corresponding to the respective corner areas, to generate compressed corner areas.

Step S2024: compressing the lateral resolution and the longitudinal resolution of the respective edge areas based on the lateral compression coefficient and the longitudinal compression coefficient corresponding to the respective edge areas, to generate unaligned edge areas.

Step S2025: performing zero padding along a target direction of the unaligned edge areas to generate a compressed edge area, the target direction being an extension direction of an edge of the compressed edge area opposite to the first area image.

For example, the compression information comprises at least two target compression arrays. Specifically, for example, the compression information comprises coeff_array 1 {coeff_x_1, a coef_y_1} and a coef_array 2 {coef_x_2, coef_y_2}, in which the coef_array1 is a target compression array and represents a combination of compression ratio of a lateral resolution and a longitudinal resolution, and coef_array 2 is another target compression array and represents another combination of compression ratio of the lateral resolution and the longitudinal resolution. The target compression array has a corresponding relationship with an inner layer area and an outer layer area of the second area image. For example, the coef_array1 corresponds to the inner layer area of the second area image, and the coef_array2 corresponds to the outer layer area of the second area image, i.e., the inner layer area and the outer layer area of the second area image and combined with different compression ratios to compress the lateral resolution and the longitudinal resolution.

Figure 14:
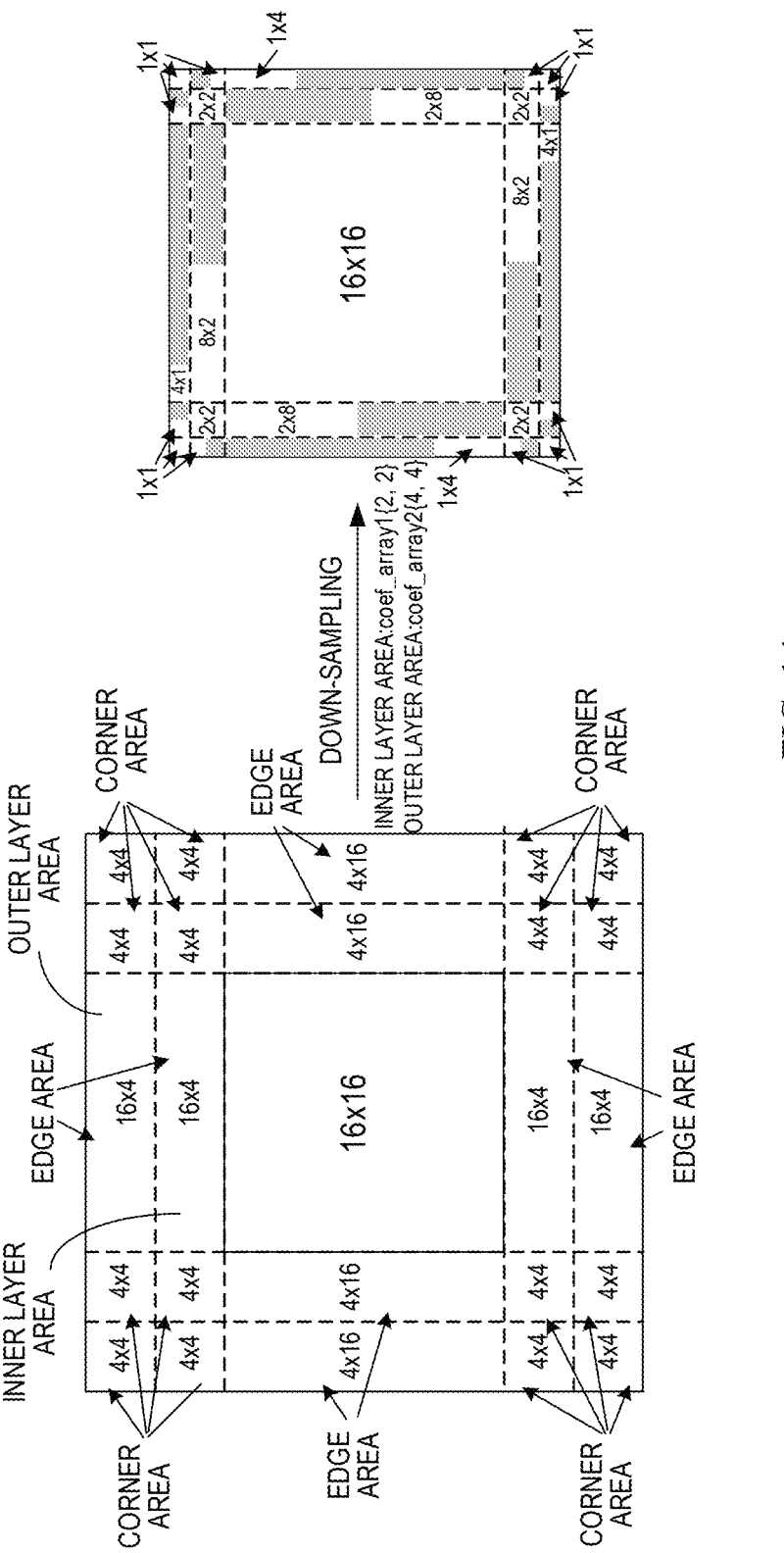
FIG. 14 is another schematic diagram of compressing the second area image according to an embodiment of the present disclosure.

FIG. 14 is another schematic diagram of compressing the second area image according to an embodiment of the present disclosure. As shown in FIG. 14, the second area image comprises an inner layer area and an outer layer area, wherein the inner layer area comprises four corner areas with a pixel size of 4×4, two 4×16 longitudinal edge regions and two 16×4 lateral edge regions, and the outer layer region comprises four corner regions with a pixel size of 4×4, and 12 edge regions (including edge regions of 4×4, 4×16 and 16×4, which will not be repeated). According to the target compression array coef_array1 {2, 2}, the edge areas and the corner areas within the inner layer area are compressed, so that the lateral resolution and the longitudinal resolution of the edge areas and the corner areas within the inner layer area are respectively reduced to ½ of the original one. According to the target compression array coef_array2 {4, 4}, the edge areas and the corner areas in the outer layer area are compressed, so that the lateral resolution and the longitudinal resolution of the edge areas and the corner areas within the outer layer area are respectively reduced to ¼ of the original one.

Meanwhile, based on the restrictive position relation among the corner areas, the edge areas and the first area image, the edge area where the edge area cannot be aligned with the first area image in the target direction is an unaligned area. Referring to FIG. 14, zero padding (shown as hatching filling in the figure) is performed on the unaligned edge along a target direction according to a pixel scale of a first area image, to generate a corresponding compressed edge region, so that a third area image composed of the compressed edge region and the compressed corner region may be joined with the first area image into a complete frame of image. Meanwhile, when the inner layer area and the outer layer area include more sub-inner layer areas and more sub-outer layer areas, the above process is still applicable, and will not be repeated herein.

In the steps of the embodiment, by differentially compressing respective layers of the second area image with different compression coefficient arrays according to the compression information, multi-level compression of the second area image is achieved. Meanwhile, based on the compression coefficient array, the compression in two directions of the lateral resolution and the longitudinal resolution is implemented, which can further improve the compression rate and reduce the volume of a compressed image.

It should be noted that, in this embodiment, the process of compressing the second area image is implemented on the basis of obtaining an independent first area image and second area image by dividing the image to be processed. Therefore, in the process of compressing the second area image, each sub-area of the second area image is compressed and then being joined to obtain the third area image. In another implementation, based on another compression manner for the second area image, that is, the method corresponding to steps S1024 to S1025 in the embodiment shown in FIG. 3, on the basis that the pixel point coordinates of respective sub-areas (inner layer area, outer layer area, edge area, corner area) of the second area image may be determined, pixel points of the image to be processed line by line are read to obtain a line pixel sequence, and the pixel points corresponding to the described sub-areas in each line pixel sequence are compressed (down-sampled). In such way, the third area image is obtained without joining, thereby reducing delay and memory requirements, and improving an image processing speed. A specific implementation process of compressing respective sub-areas of the second area image by reading pixel points of the image to be processed line by line is similar to the process of processing the second area image in the embodiment shown in FIG. 3. Reference may be made to the description in the corresponding paragraph in the embodiment shown in FIG. 3, and details are not repeated herein.

Step S203: joining the compressed corner areas and the compressed edge areas based on a position relationship between the respective corner areas and the respective edge areas, to generate a third area image.

For example, after the compressed corner area and the compressed edge area of respective layers of the second area image are obtained, joining is performed based on a position relationship between respective corner areas and respective edge areas, so that the size of the third area image matches the size of the first area image, that is, the third area image can surround the first area image and be joined with the first area image to form a complete image. This process is described in the foregoing steps, and is not repeated herein.

For example, the first area image comprises a transition area, the transition area is located at an inner edge of the first area image, and the process further comprises, before joining the first area image and the third area image:

Step S204: sampling the transition area to obtain a first transition image and a second transition image, the resolution of the first transition image being larger than the resolution of the second transition image.

Step S205: mixing the first transition image and the second transition image based on positions of the pixel points of the first transition image and the pixel points of the second transition image in the transition area, to generate a mixed image.

Step S206: overlaying the mixed image on the transition area.

For example, in order to improve a smooth transition between a first area image of high resolution and a third area image of low resolution, a smooth transition effect needs to be set at the junction of the first area image and the third area image. FIG. 15 is a schematic diagram of a transition area according to an embodiment of the present disclosure. As shown in FIG. 15, for example, the transition area is disposed at an edge of the first area image, and a first transition image of high resolution and a second transition image of low resolution may be obtained by performing a high sampling rate image acquisition and a low sampling rate image acquisition on the transition area. Based on positions of the pixel points of the first transition image in the transition area and positions of the pixel points of the second transition image in the transition area, alpha fusion is performed on the first transition image and the second transition image, to generate a mixed image with a resolution gradually changing with the position of the transition region, and then the mixed image is overlaid on the transition area to complete a smooth transition between a first area image and a third area image. During the alpha mixing, different configurations may be performed by adjusting values of the polynomial, so as to implement image mixture based on different mixture curves. A specific implementation for performing alpha fusion based on two frame images is a prior art known to a person skilled in the art, and is not described herein again.

Step S207: joining the first area image and the third area image to generate a compressed image, and sending the compressed image to a display unit for display.

Step S208: receiving the compressed image by the display unit, and interpolating the third area image corresponding to the compressed image to obtain a fourth area image.

For example, the third area image comprises a plurality of sub-areas, the compressed image comprises identification information, the identification information is used for representing position coordinates of respective sub-areas of the third area image and corresponding compression information. As shown in FIG. 16, the specific implementation of Step S208 comprises:

Step S2081: obtaining identification information corresponding to the compressed image.

Step S2082: interpolating the respective sub-areas of the third area image based on the identification information to obtain up-sampled images corresponding to the respective sub-areas.

Step S2083: joining the up-sampled images corresponding to the respective sub-areas to obtain the fourth area image.

For example, the display unit is, for example, a DDIC. When the third area image comprises a compressed inner layer area and a compressed outer layer area, and compression ratios of the compressed inner layer area and the compressed outer layer area are different, DDIC receives compressed image data comprising a compressed image and corresponding identification information, wherein the identification information is used for representing position coordinates of respective sub-areas of the third area image and corresponding compression information. For example, the third area image comprises a compressed inner layer area and an compressed outer layer area, the compressed inner layer area comprises 8 sub-areas, respectively being 4 corner areas and 4 edge areas; the compressed outer layer area comprises 16 sub-areas, respectively being 4 corner areas and 12 edge areas. The identification information records the area identifiers, the area coordinates, and the target compression coefficients corresponding to respective sub-areas in the above compressed inner layer area and compressed outer layer area. The DDIC sequentially determines respective sub-areas in the third area image according to the area identifier in the identification information, and interpolates the respective sub-areas respectively to obtain the up-sampled image corresponding to the respective sub-areas. Then, the respective up-sampled data is joined to obtain a fourth area image with high display resolution. Because the compressed inner layer area and the compressed outer layer area have different compression ratios, when the third area image is restored, interpolation performed with a fixed restoration coefficient may cause the resolution of the restored fourth area image is inaccurate, at the same time, the resolutions in areas corresponding to respective layers (an inner layer area and an outer layer area) in the fourth area image are different, affecting the visual perception of an image. In this embodiment, areas of various layers are respectively restored by identification information corresponding to the compressed image, thereby improving image restoration quality, and further improving an image visual effect.

The transition region processing procedure may be implemented in the same step as the partitioned region compression procedure.

The display unit DDIC needs to read the current fixation point positions and the predefined sizes of various partitions. After reading the compressed image line by line, it calculates the partition where the current processing pixels are located and corresponding compression ratio based on the coordinates of the current processing pixels. Based on the compression ratio, the image is interpolated and stretched to restore. Due to the unchanged order between pixel lines, DDIC does not need to wait for the entire frame or high-resolution area to be transmitted before starting to drive the screen for display, nor does it require additional large amounts of memory to store entire images of high-resolution area, reducing delay and memory requirements for DDIC.

During image interpolation and restoration, DDIC needs to use configurable filter kernel operation to reduce image defect. The filter kernel may be dynamically configured according to the compression ratio. At the same time, several lines of pixel cache may be required according to the compression ratio.

Step S209: generating a display image based on the fourth area image and the first area image, and displaying the display image.

In the embodiments of this disclosure, the processing is performed by the position coordinates of the user's current fixation on the screen obtained by the eye movement tracking apparatus, and the partition of the input image is defined based on the coordinate position and the compressed partition size of the predetermined partition area. The center of the first area is adjusted in real-time according to the position of fixation point of the user, and other areas are also adjusted around the first area. Afterwards, the image to be processed will be compressed on output pixels with different resolutions based on the coordinate position of the current pixel in the entire image and the predefined area. If the current pixel is in the first area, resolution compression will not be applied to the pixel. If the pixel is in the second area, the compressed pixel is output based on different compression ratios defined in the length and width directions for different sub-areas of the second area. It can be achieved by a method of dividing area, compressing in different areas and then join the areas, or by a method for generating entire compressed image by processing line by line and using different compression ratios based on the current pixel coordinates.

The processing results of two adjacent areas are smoothly transitioned by using a portion of pixels in respective sub-areas and close to adjacent sub-areas as a transition area. That is, in the transition area, the portion closer to the first area has more pixel components of the first area, and the portion closer to the second area has more pixel components of the second area. The process of processing the transition area may be implemented in the same step as the process of compressing in respective areas.

The compressed image is transmitted to a display unit (DDIC) at a lower bandwidth through an interface for processing.

After that, the image used for compressing the partition areas in the display unit DDIC is stretched in a corresponding proportion according to definitions of different partitions in the eye movement tracking processing module, so as to restore to the original image, thereby implementing steps of compressing, transmitting and displaying the image to be processed.

In this embodiment, step S201 is consistent with step S101 in the foregoing embodiment. Step S209 has been described in a corresponding paragraph of step S103, and is not further described herein. Refer to the discussion in the embodiment shown in FIG. 3, and is not repeated herein.

Figure 17:
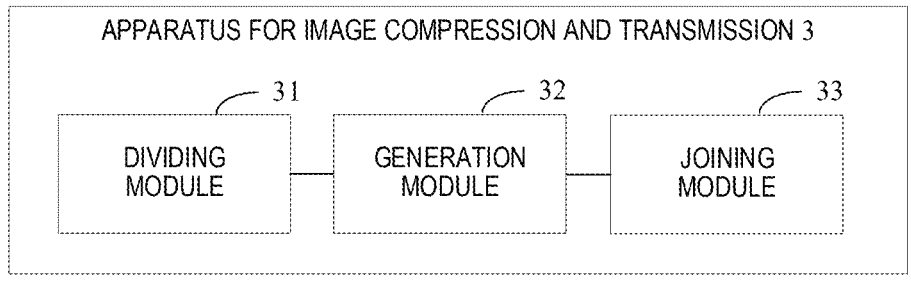
FIG. 17 is a structural block diagram of an apparatus for image compression and transmission according to an embodiment of the present disclosure.

Corresponding to the method for image compression and transmission in the foregoing embodiments, FIG. 17 is a structural block diagram of an apparatus for image compression and transmission according to an embodiment of the present disclosure. For convenience of description, only parts related to the embodiments of the present disclosure are illustrated. Referring to FIG. 17, the apparatus 3 for image compression and transmitting comprises:

a dividing module 31 configured to divide an image to be processed into a first area image and a second area image, the first area image being located at a center of the image to be processed, the second area image surrounding an outer side of the first area image, and an inner contour of the second area image meeting the first area image;

a generation module 32 configured to compress the second area image based on compression information to generate a third area image, the compression information being used for indicating a compression mode of the second area image, an inner contour of the third area image meeting the first area image, and a resolution of the third area image being smaller than the resolution of the second area image; and a joining module 33 configured to generate a compressed image based on the third area image, and sending the compressed image to a display unit for displaying.

In an embodiment of this disclosure, the first area image is a rectangle, the second area image comprises four corner areas and at least four edge areas, the four corner areas and the at least four edge areas surround the first area image and are adjacent to the first area image respectively; the generation module 32 is specifically configured for: compressing the respective corner areas and the respective edge areas based on the compression information, to obtain compressed corner areas corresponding to the respective corner areas and compressed edge areas corresponding to the respective edge areas; joining the compressed corner areas and the compressed edge areas based on a position relationship between the respective corner areas and the respective edge areas, to generate a third area image.

In an embodiment of this disclosure, the compression information comprises a target compression coefficient, and the target compression coefficient represents a resolution compression ratio; the generation module 32, when compressing the respective corner areas and the respective edge areas based on the compression information, to obtain compressed corner areas corresponding to the respective corner areas and compressed edge areas corresponding to the respective edge areas, is specifically configure for: compressing a lateral resolution and a longitudinal resolution of the respective corner areas based on the target compression coefficient, to obtain compressed corner areas corresponding to the respective corner areas; and compressing a resolution of a target direction of the respective edge areas based on the target compression coefficient to obtain compressed edge areas corresponding to the respective edge areas, the target direction being a longitudinal direction of an edge of the edge area opposite to the first area image.

In an embodiment of this disclosure, the compression information comprises at least two target compression arrays, and the target compression arrays comprise a lateral compression coefficient and a longitudinal compression coefficient, the lateral compression coefficient represents a lateral resolution compression ratio, and the longitudinal compression coefficient represents a longitudinal resolution compression ratio; the generation module 32, when compressing the respective corner areas and the respective edge areas based on the compression information, to obtain compressed corner areas corresponding to the respective corner areas and compressed edge areas corresponding to the respective edge areas, is specifically configured for: compressing the lateral resolution and the longitudinal resolution of the respective corner areas based on the lateral compression coefficient and the longitudinal compression coefficient corresponding to the respective corner areas, to generate compressed corner areas; compressing the lateral resolution and the longitudinal resolution of the respective edge areas based on the lateral compression coefficient and the longitudinal compression coefficient corresponding to the respective edge areas, to generate unaligned edge areas; and performing zero padding along a target direction of the unaligned edge areas to generate a compressed edge area, the target direction being an extension direction of an edge of the compressed edge area opposite to the first area image.

In an embodiment of this disclosure, the second area image comprises an inner layer area and an outer layer area, wherein an inner contour of the inner layer area is adjacent to the first area image, and an outer contour of the inner layer area is adjacent to an inner contour of the outer layer area; the compression information comprises a first compression coefficient corresponding to the inner layer area and a second compression coefficient corresponding to the outer layer area;

the generation module 32 is specifically configured for: compressing the inner layer area based on the first compression coefficient to obtain the compressed inner layer area; compressing the outer layer area based on the second compression coefficient to obtain the compressed outer layer area, wherein a resolution of the compressed inner layer area is different from a resolution of the compressed outer layer area; and joining, based on a position relationship between the inner layer area and the outer layer area, the compressed inner layer area and the compressed outer layer area to obtain the third area image, wherein the inner contour of the compressed inner layer area is adjacent to the first area image, and the outer contour of the compressed inner layer area is adjacent to the inner contour of the compressed outer layer area.

In an embodiment of this disclosure, the first area image comprises a transition area, the transition area is located at an inner edge of the first area image, and the joining module, before generating a compressed image based on the third area image, is configured for: sampling the transition area to obtain a first transition image and a second transition image, the resolution of the first transition image being larger than the resolution of the second transition image; mixing the first transition image and the second transition image based on positions of the pixel points of the first transition image and the pixel points of the second transition image in the transition area, to generate a mixed image; and overlaying the mixed image on the transition area.

In an embodiment of this disclosure, the terminal device comprises a display screen; the dividing module 31 is specifically configured for: collecting visual information, the visual information representing an angle of a visual fixation on the display screen; and dividing the image to be processed into the first area image and the second area image based on the visual information.

In an embodiment of this disclosure, the dividing module 31, when dividing the image to be processed into the first area image and the second area image based on the visual information, is specifically configured for: determining fixation point information according to the visual information, the fixation point information representing mapping coordinates of a visual fixation point on a screen; determining coordinates of the first area image in the image to be processed according to the fixation point information and a pixel size of the image to be processed; and dividing the image to be processed into the first area image and the second area image based on the coordinates of the first area image.

In an embodiment of this disclosure, the apparatus 3 for image compression and transmission further comprises: a display module 34 configured for receiving the compressed image by the display unit, and interpolating the third area image corresponding to the compressed image to obtain a fourth area image; and generating a display image based on the fourth area image and the first area image, and displaying the display image.

In an embodiment of this disclosure, the third area image comprises a plurality of sub-areas, the compressed image comprises identification information, the identification information is used for representing position coordinates of respective sub-areas of the third area image and corresponding compression information, and the display module 34, when interpolating the third area image corresponding to the compressed image to obtain the fourth area image, is specifically configured for: obtaining identification information corresponding to the compressed image; interpolating the respective sub-areas of the third area image based on the identification information to obtain up-sampled images corresponding to the respective sub-areas; and joining the up-sampled images corresponding to the respective sub-areas to obtain the fourth area image.

The dividing module 31, the generation module 32, the joining module 33, and the displaying module 34 are connected in sequence. The apparatus 3 for image compression and transmission provided in this embodiment can execute the technical solutions of the foregoing method embodiments. The implementation principles and technical effects are similar, and are not further described herein.

Figure 18:
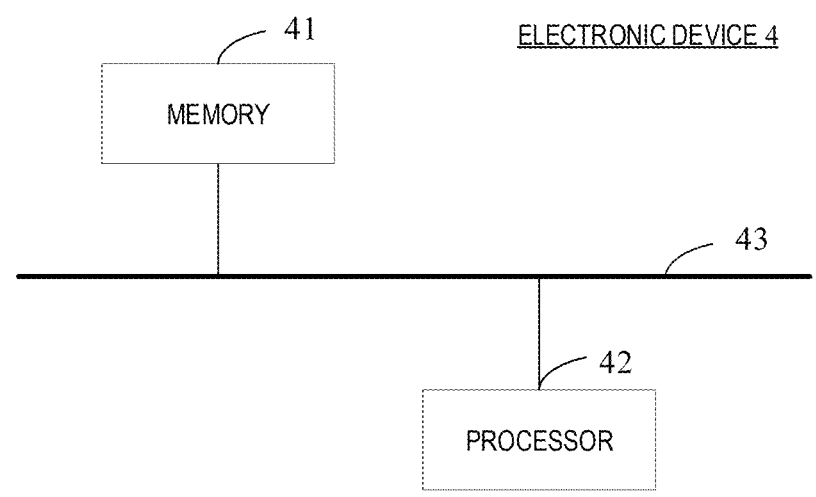
FIG. 18 is a schematic structural diagram of an electronic device according to an embodiment of the present disclosure.

FIG. 18 is a schematic structural diagram of an electronic device according to an embodiment of the present disclosure. As shown in FIG. 18, the electronic device 4 comprises:

a processor 42, and a memory 41 communicatively connected with the processor 42;

the memory 41 storing a computer executable instruction; and the processor 42 executing the computer executable instruction stored in the memory 41 to implement the image compression and transmission method of FIGS. 3-16.

Optionally, the processor 42 and the memory 41 are connected by a bus 43.

The related descriptions may be understood with reference to the related descriptions and effects corresponding to the steps in the embodiments corresponding to FIG. 3 to FIG. 16, and will not be repeated herein.

Figure 19:
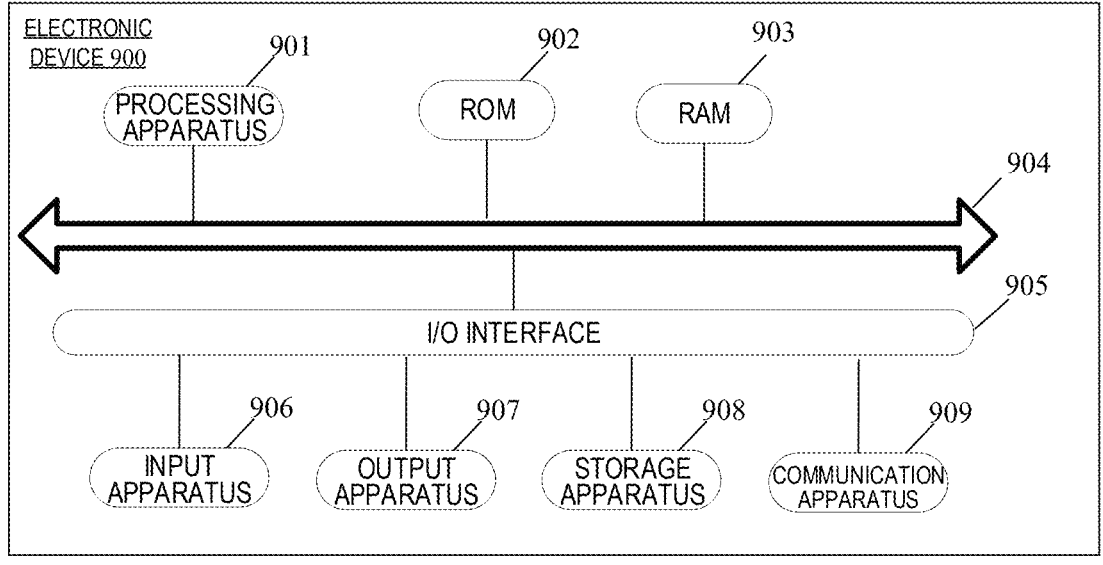
FIG. 19 is a schematic structural diagram of hardware of the electronic device according to an embodiment of the present disclosure.

Referring to FIG. 19, it shows a schematic structural diagram of an electronic device 900 suitable for implementing an embodiment of the present disclosure. The electronic device 900 may be a terminal device or a server. The terminal device may include, but is not limited to, a mobile terminal such as a mobile phone, a notebook computer, a digital broadcast receiver, a personal digital assistant (PDA), a portable android device (PAD), a portable multimedia player (PMP), a vehicle-mounted terminal (for example, a vehicle-mounted navigation terminal), and the like, and a fixed terminal such as a digital TV, a desktop computer, and the like. The electronic device shown in FIG. 19 is merely an example and should not bring any limitation to the functions and scope of use of the embodiments of the present disclosure.

As shown in FIG. 19, the electronic device 900 may include processing apparatus (e.g., central processing unit, graphics processing unit, etc.) 901 that may perform various suitable actions and processes in accordance with a program stored in read only memory (ROM) 902 or a program loaded into random access memory (RAM) 903 from storage apparatus 908. In the RAM 903, various programs and data necessary for the operation of the electronic device 900 are also stored. The processing apparatus 901, the ROM 902, and the RAM 903 are connected to each other via a bus 904. An input/output (I/O) interface 905 is also connected to the bus 904.

In general, the following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a liquid crystal display (LCD), a speaker, a vibrator, or the like; a storage apparatus 908 including, for example, a magnetic tape, a hard disk, or the like; and a communication apparatus 909. The communication apparatus 909 may allow electronic device 900 to communicate wirelessly or wired with other devices to exchange data. While FIG. 19 illustrates an electronic device 900 with a variety of component, it should be understood that it is not required that all of the illustrated components be implemented or provided. More or fewer components may alternatively be implemented or provided.

In particular, the processes described above with reference to the flowcharts may be implemented as computer software programs in accordance with embodiments of the present disclosure. For example, embodiments of the present disclosure include a computer program product comprising a computer program carried on a computer readable medium. The computer program comprises a program code for executing the method as shown in the flowchart. In such an embodiment, the computer program may be downloaded and installed from the network via communications apparatus 909, or installed from storage apparatus 908, or installed from ROM 902. When the computer program is executed by the processing apparatus 901, the above-described functions defined in the method of embodiments of the present disclosure are executed.

It should be noted that the computer readable medium in the present disclosure may be a computer readable signal medium or a computer readable storage medium, or any combination thereof. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic signal, optical signal, or any suitable combination thereof. A computer readable signal medium may also be any computer readable medium that is not a computer readable storage medium and that can sent, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The computer readable medium may be included in the electronic device, or may exist separately and not be installed in the electronic device.

The computer readable medium carries one or more programs, and when the one or more programs are executed by the electronic device, the electronic device is enabled to execute the method shown in the foregoing embodiments.

Computer program code for carrying out operations for aspects of the present disclosure may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The units involved in the embodiments of the present disclosure may be implemented through software or hardware. The name of a unit does not constitute a limitation to the unit itself in some cases, for example, the dividing module may also be described as "module configured for dividing the image to be processed into a first area image and a second area image".

The functions described herein above may be performed, at least in part, by one or more hardware logic components. For example, without limitation, exemplary types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In a first aspect, according to one or more embodiments of the disclosure, a method for image compression and transmission is provided, the method being applied at a terminal device and comprising:

dividing an image to be processed into a first area image and a second area image, the first area image being located at a center of the image to be processed, the second area image surrounding an outer side of the first area image, and an inner contour of the second area image being adjacent to the first area image; compressing the second area image based on compression information to generate a third area image, the compression information being used for indicating a compression mode of the second area image, an inner contour of the third area image being adjacent to the first area image, and a resolution of the third area image being smaller than a resolution of the second area image; and generating a compressed image based on the third area image, and sending the compressed image to a display unit for displaying.

According to one or more embodiments of the disclosure, the first area image is a rectangle, the second area image comprises four corner areas and at least four edge areas, the four corner areas and the at least four edge areas surround the first area image and are adjacent to the first area image respectively; compressing the second area image based on the compression information to generate the third area image comprises: compressing the respective corner areas and the respective edge areas based on the compression information, to obtain compressed corner areas corresponding to the respective corner areas and compressed edge areas corresponding to the respective edge areas; joining the compressed corner areas and the compressed edge areas based on a position relationship between the respective corner areas and the respective edge areas, to generate a third area image.

According to one or more embodiments of the disclosure, the compression information comprises a target compression coefficient, and the target compression coefficient represents a resolution compression ratio; compressing the respective corner areas and the respective edge areas based on the compression information, to obtain compressed corner areas corresponding to the respective corner areas and compressed edge areas corresponding to the respective edge areas comprises: compressing a lateral resolution and a longitudinal resolution of the respective corner areas based on the target compression coefficient, to obtain compressed corner areas corresponding to the respective corner areas; and compressing a resolution of a target direction of the respective edge areas based on the target compression coefficient to obtain compressed edge areas corresponding to the respective edge areas, the target direction being a longitudinal direction of an edge of the edge area opposite to the first area image.

According to one or more embodiments of the disclosure, the compression information comprises at least two target compression arrays, and the target compression arrays comprise a lateral compression coefficient and a longitudinal compression coefficient, the lateral compression coefficient represents a lateral resolution compression ratio, and the longitudinal compression coefficient represents a longitudinal resolution compression ratio; compressing the respective corner areas and the respective edge areas based on the compression information, to obtain compressed corner areas corresponding to the respective corner areas and compressed edge areas corresponding to the respective edge areas comprises: compressing the lateral resolution and the longitudinal resolution of the respective corner areas based on the lateral compression coefficient and the longitudinal compression coefficient corresponding to the respective corner areas, to generate compressed corner areas; compressing the lateral resolution and the longitudinal resolution of the respective edge areas based on the lateral compression coefficient and the longitudinal compression coefficient corresponding to the respective edge areas, to generate unaligned edge areas; and performing zero padding along a target direction of the unaligned edge areas to generate a compressed edge area, the target direction being an extension direction of an edge of the compressed edge area opposite to the first area image.

According to one or more embodiments of the disclosure, the second area image comprises an inner layer area and an outer layer area, wherein an inner contour of the inner layer area is adjacent to the first area image, and an outer contour of the inner layer area is adjacent to an inner contour of the outer layer area; the compression information comprises a first compression coefficient corresponding to the inner layer area and a second compression coefficient corresponding to the outer layer area; compressing the second area image based on compression information to generate the third area image comprises: compressing the inner layer area based on the first compression coefficient to obtain the compressed inner layer area; compressing the outer layer area based on the second compression coefficient to obtain the compressed outer layer area, wherein a resolution of the compressed inner layer area is different from a resolution of the compressed outer layer area; and joining, based on a position relationship between the inner layer area and the outer layer area, the compressed inner layer area and the compressed outer layer area to obtain the third area image, wherein the inner contour of the compressed inner layer area is adjacent to the first area image, and the outer contour of the compressed inner layer area is adjacent to the inner contour of the compressed outer layer area.

According to one or more embodiments of the disclosure, the first area image comprises a transition area, the transition area is located at an inner edge of the first area image, and the method further comprises, before the generating a compressed image based on the third area image: sampling the transition area to obtain a first transition image and a second transition image, the resolution of the first transition image being larger than the resolution of the second transition image; mixing the first transition image and the second transition image based on positions of the pixel points of the first transition image and the pixel points of the second transition image in the transition area, to generate a mixed image; and overlaying the mixed image on the transition area.

According to one or more embodiments of the disclosure, the terminal device comprises a display screen; and dividing the image to be processed into the first area image and the second area image comprises: collecting visual information, the visual information representing an angle of a visual fixation on the display screen; and dividing the image to be processed into the first area image and the second area image based on the visual information.

According to one or more embodiments of the disclosure, dividing the image to be processed into the first area image and the second area image based on the visual information comprises: determining fixation point information according to the visual information, the fixation point information representing mapping coordinates of a visual fixation point on a screen; determining coordinates of the first area image in the image to be processed according to the fixation point information and a pixel size of the image to be processed; and dividing the image to be processed into the first area image and the second area image based on the coordinates of the first area image.

According to one or more embodiments of the disclosure, the method further comprises: receiving the compressed image by the display unit, and interpolating the third area image corresponding to the compressed image to obtain a fourth area image; and generating a display image based on the fourth area image and the first area image, and displaying the display image.

According to one or more embodiments of the disclosure, the third area image comprises a plurality of sub-areas, the compressed image comprises identification information, the identification information is used for representing position coordinates of respective sub-areas of the third area image and corresponding compression information, and interpolating the third area image corresponding to the compressed image to obtain the fourth area image comprises: obtaining identification information corresponding to the compressed image; interpolating the respective sub-areas of the third area image based on the identification information to obtain up-sampled images corresponding to the respective sub-areas; and joining the up-sampled images corresponding to the respective sub-areas to obtain the fourth area image.

In a second aspect, according to one or more embodiments of the disclosure, an apparatus for image compression and transmission is provided. The apparatus comprises:

a dividing module configured to divide an image to be processed into a first area image and a second area image, the first area image being located at a center of the image to be processed, the second area image surrounding an outer side of the first area image, and an inner contour of the second area image meeting the first area image;

a generation module configured to compress the second area image based on compression information to generate a third area image, the compression information being used for indicating a compression mode of the second area image, an inner contour of the third area image meeting the first area image, and a resolution of the third area image being smaller than the resolution of the second area image; and a joining module configured to generate a compressed image based on the third area image, and sending the compressed image to a display unit for displaying.

According to one or more embodiments of the disclosure, the first area image is a rectangle, the second area image comprises four corner areas and at least four edge areas, the four corner areas and the at least four edge areas surround the first area image and are adjacent to the first area image respectively; the generation module is specifically configured fore: compressing the respective corner areas and the respective edge areas based on the compression information, to obtain compressed corner areas corresponding to the respective corner areas and compressed edge areas corresponding to the respective edge areas; joining the compressed corner areas and the compressed edge areas based on a position relationship between the respective corner areas and the respective edge areas, to generate a third area image.

According to one or more embodiments of the disclosure, the compression information comprises a target compression coefficient, and the target compression coefficient represents a resolution compression ratio; the generation module, when compressing the respective corner areas and the respective edge areas based on the compression information, to obtain compressed corner areas corresponding to the respective corner areas and compressed edge areas corresponding to the respective edge areas, is specifically configure for: compressing a lateral resolution and a longitudinal resolution of the respective corner areas based on the target compression coefficient, to obtain compressed corner areas corresponding to the respective corner areas; and compressing a resolution of a target direction of the respective edge areas based on the target compression coefficient to obtain compressed edge areas corresponding to the respective edge areas, the target direction being a longitudinal direction of an edge of the edge area opposite to the first area image.

According to one or more embodiments of the disclosure, the compression information comprises at least two target compression arrays, and the target compression arrays comprise a lateral compression coefficient and a longitudinal compression coefficient, the lateral compression coefficient represents a lateral resolution compression ratio, and the longitudinal compression coefficient represents a longitudinal resolution compression ratio; the generation module, when compressing the respective corner areas and the respective edge areas based on the compression information, to obtain compressed corner areas corresponding to the respective corner areas and compressed edge areas corresponding to the respective edge areas, is specifically configured for: compressing the lateral resolution and the longitudinal resolution of the respective corner areas based on the lateral compression coefficient and the longitudinal compression coefficient corresponding to the respective corner areas, to generate compressed corner areas; compressing the lateral resolution and the longitudinal resolution of the respective edge areas based on the lateral compression coefficient and the longitudinal compression coefficient corresponding to the respective edge areas, to generate unaligned edge areas; and performing zero padding along a target direction of the unaligned edge areas to generate a compressed edge area, the target direction being an extension direction of an edge of the compressed edge area opposite to the first area image.

According to one or more embodiments of the disclosure, the second area image comprises an inner layer area and an outer layer area, wherein an inner contour of the inner layer area is adjacent to the first area image, and an outer contour of the inner layer area is adjacent to an inner contour of the outer layer area; the compression information comprises a first compression coefficient corresponding to the inner layer area and a second compression coefficient corresponding to the outer layer area; the generation module is specifically configured for: compressing the inner layer area based on the first compression coefficient to obtain the compressed inner layer area; compressing the outer layer area based on the second compression coefficient to obtain the compressed outer layer area, wherein a resolution of the compressed inner layer area is different from a resolution of the compressed outer layer area; and joining, based on a position relationship between the inner layer area and the outer layer area, the compressed inner layer area and the compressed outer layer area to obtain the third area image, wherein the inner contour of the compressed inner layer area is adjacent to the first area image, and the outer contour of the compressed inner layer area is adjacent to the inner contour of the compressed outer layer area.

According to one or more embodiments of the disclosure, the first area image comprises a transition area, the transition area is located at an inner edge of the first area image, and the joining module, before generating a compressed image based on the third area image, is configured for: sampling the transition area to obtain a first transition image and a second transition image, the resolution of the first transition image being larger than the resolution of the second transition image; mixing the first transition image and the second transition image based on positions of the pixel points of the first transition image and the pixel points of the second transition image in the transition area, to generate a mixed image; and overlaying the mixed image on the transition area.

According to one or more embodiments of the disclosure, the terminal device comprises a display screen; the dividing module is specifically configured for: collecting visual information, the visual information representing an angle of a visual fixation on the display screen; and dividing the image to be processed into the first area image and the second area image based on the visual information.

According to one or more embodiments of the disclosure, the dividing module, when dividing the image to be processed into the first area image and the second area image based on the visual information, is specifically configured for: determining fixation point information according to the visual information, the fixation point information representing mapping coordinates of a visual fixation point on a screen; determining coordinates of the first area image in the image to be processed according to the fixation point information and a pixel size of the image to be processed; and dividing the image to be processed into the first area image and the second area image based on the coordinates of the first area image.

According to one or more embodiments of the disclosure, the apparatus for image compression and transmission further comprises: a display module configured for receiving the compressed image by the display unit, and interpolating the third area image corresponding to the compressed image to obtain a fourth area image; and generating a display image based on the fourth area image and the first area image, and displaying the display image.

According to one or more embodiments of the disclosure, the third area image comprises a plurality of sub-areas, the compressed image comprises identification information, the identification information is used for representing position coordinates of respective sub-areas of the third area image and corresponding compression information, and the display module, when interpolating the third area image corresponding to the compressed image to obtain the fourth area image, is specifically configured for: obtaining identification information corresponding to the compressed image; interpolating the respective sub-areas of the third area image based on the identification information to obtain up-sampled images corresponding to the respective sub-areas; and joining the up-sampled images corresponding to the respective sub-areas to obtain the fourth area image.

In a third aspect, according to one or more embodiments of the disclosure, an electronic device is provided. The electronic device comprises: a processor, and a memory communicatively connected with the processor;

the memory storing a computer executable instruction; and the processor executing the computer executable instruction stored in the memory to implement the image compression and transmission method of the first aspect and its various possible designs.

In a fourth aspect, according to one or more embodiment of the disclosure, a computer readable storage medium storing a computer executable instruction is provided, the computer executable instruction, when executed by a processor, implementing a method for image compression and transmission of the first aspect and its various possible designs.

In a fifth aspect, according to one or more embodiments of the disclosure, a computer program product is provided, comprising a computer program, the computer program, when executed by a processor, implementing a method for image compression and transmission of the first aspect and its various possible designs.

In a sixth aspect, according to one or more embodiments of the disclosure, a computer program is provided, the computer program, when executed by a processor, implementing a method for image compression and transmission method of the first aspect and its various possible designs.

The embodiments of this disclosure provide an image compression and transmission method and apparatus, an electronic device and a storage medium. An image to be processed is divided into a first area image and a second area image, the first area image is located at a center of the image to be processed, the second area image surrounds an outer side of the first area image, and an inner contour of the second area image is adjacent to the first area image. The second area image is compressed based on compression information to generate a third area image, wherein the compression information is used for indicating a compression mode of the second area image, an inner contour of the third area image is adjacent to the first area image, and a resolution of the third area image is smaller than a resolution of the second area image. A compressed image is generated based on the third area image, and the compressed image is sent to a display unit for displaying.

The foregoing description is merely illustrative of the preferred embodiments of the present disclosure and of the technical principles applied thereto. As will be appreciated by those skilled in the art, the disclosure of the present disclosure is not limited to the technical solution formed by the specific combination of the described technical features, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for image compression and transmission, the method being applied at a terminal device and comprising:

dividing an image to be processed into a first area image and a second area image, the first area image being located at a center of the image to be processed, the second area image surrounding an outer side of the first area image, and an inner contour of the second area image being adjacent to the first area image;

compressing the second area image based on compression information to generate a third area image, the compression information being used for indicating a compression mode of the second area image, an inner contour of the third area image being adjacent to the first area image, and a resolution of the third area image being smaller than a resolution of the second area image; and generating a compressed image based on the third area image, and sending the compressed image to a display unit for displaying;

wherein the first area image comprises a transition area, the transition area is located at an inner edge of the first area image, and the method further comprises, before the generating a compressed image based on the third area image:

sampling the transition area to obtain a first transition image and a second transition image, the resolution of the first transition image being larger than the resolution of the second transition image;

mixing the first transition image and the second transition image based on positions of the pixel points of the first transition image and the pixel points of the second transition image in the transition area, to generate a mixed image; and overlaying the mixed image on the transition area.

2. The method of claim 1, wherein compressing the second area image based on the compression information to generate the third area image comprises:

reading pixel points of the image to be processed line by line to obtain line pixel sequences; and compressing pixel points corresponding to the second area image in respective line pixel sequences based on the compression information, to obtain the third area image.

3. The method of claim 1, wherein the first area image is a rectangle, the second area image comprises four corner areas and at least four edge areas, the four corner areas and the at least four edge areas surround the first area image and are adjacent to the first area image respectively;

compressing the second area image based on the compression information to generate the third area image comprises:

compressing the respective corner areas and the respective edge areas based on the compression information, to obtain compressed corner areas corresponding to the respective corner areas and compressed edge areas corresponding to the respective edge areas;

joining the compressed corner areas and the compressed edge areas based on a position relationship between the respective corner areas and the respective edge areas, to generate a third area image;

generating the compressed image based on the third area image comprises:

joining the first area image and the third area image to generate the compressed image.

4. The method of claim 3, wherein the compression information comprises a target compression coefficient, and the target compression coefficient represents a resolution compression ratio;

compressing the respective corner areas and the respective edge areas based on the compression information, to obtain compressed corner areas corresponding to the respective corner areas and compressed edge areas corresponding to the respective edge areas comprises:

compressing a lateral resolution and a longitudinal resolution of the respective corner areas based on the target compression coefficient, to obtain compressed corner areas corresponding to the respective corner areas; and compressing a resolution of a target direction of the respective edge areas based on the target compression coefficient to obtain compressed edge areas corresponding to the respective edge areas, the target direction being a longitudinal direction of an edge of the edge area opposite to the first area image.

5. The method of claim 3, wherein the compression information comprises at least two target compression arrays, and the target compression arrays comprise a lateral compression coefficient and a longitudinal compression coefficient, the lateral compression coefficient represents a lateral resolution compression ratio, and the longitudinal compression coefficient represents a longitudinal resolution compression ratio;

compressing the respective corner areas and the respective edge areas based on the compression information, to obtain compressed corner areas corresponding to the respective corner areas and compressed edge areas corresponding to the respective edge areas comprises:

compressing the lateral resolution and the longitudinal resolution of the respective corner areas based on the lateral compression coefficient and the longitudinal compression coefficient corresponding to the respective corner areas, to generate compressed corner areas;

compressing the lateral resolution and the longitudinal resolution of the respective edge areas based on the lateral compression coefficient and the longitudinal compression coefficient corresponding to the respective edge areas, to generate unaligned edge areas; and performing zero padding along a target direction of the unaligned edge areas to generate a compressed edge area, the target direction being an extension direction of an edge of the compressed edge area opposite to the first area image.

6. The method of claim 1, wherein the second area image comprises an inner layer area and an outer layer area, wherein an inner contour of the inner layer area is adjacent to the first area image, and an outer contour of the inner layer area is adjacent to an inner contour of the outer layer area; the compression information comprises a first compression coefficient corresponding to the inner layer area and a second compression coefficient corresponding to the outer layer area;

compressing the second area image based on compression information to generate the third area image comprises:

compressing the inner layer area based on the first compression coefficient to obtain the compressed inner layer area;

compressing the outer layer area based on the second compression coefficient to obtain the compressed outer layer area, wherein a resolution of the compressed inner layer area is different from a resolution of the compressed outer layer area; and joining, based on a position relationship between the inner layer area and the outer layer area, the compressed inner layer area and the compressed outer layer area to obtain the third area image, wherein the inner contour of the compressed inner layer area is adjacent to the first area image, and the outer contour of the compressed inner layer area is adjacent to the inner contour of the compressed outer layer area.

7. The method of claim 1, wherein the terminal device comprises a display screen; and dividing the image to be processed into the first area image and the second area image comprises:

collecting visual information, the visual information representing an angle of a visual fixation on the display screen; and dividing the image to be processed into the first area image and the second area image based on the visual information.

8. The method of claim 7, wherein dividing the image to be processed into the first area image and the second area image based on the visual information comprises:

determining fixation point information according to the visual information, the fixation point information representing mapping coordinates of a visual fixation point on a screen;

determining coordinates of the first area image in the image to be processed according to the fixation point information and a pixel size of the image to be processed; and dividing the image to be processed into the first area image and the second area image based on the coordinates of the first area image.

9. The method of claim 1, further comprising:

receiving the compressed image by the display unit, and interpolating the third area image corresponding to the compressed image to obtain a fourth area image; and generating a display image based on the fourth area image and the first area image, and displaying the display image.

10. The method of claim 9, wherein the third area image comprises a plurality of sub-areas, the compressed image comprises identification information, the identification information is used for representing position coordinates of respective sub-areas of the third area image and corresponding compression information, and interpolating the third area image corresponding to the compressed image to obtain the fourth area image comprises:

obtaining identification information corresponding to the compressed image;

interpolating the respective sub-areas of the third area image based on the identification information to obtain up-sampled images corresponding to the respective sub-areas; and joining the up-sampled images corresponding to the respective sub-areas to obtain the fourth area image.

11. An electronic device, comprising: a processor, and a memory communicatively connected with the processor;

the memory storing a computer executable instruction; and the processor executing the computer executable instruction stored in the memory to implement acts comprising:

dividing an image to be processed into a first area image and a second area image, the first area image being located at a center of the image to be processed, the second area image surrounding an outer side of the first area image, and an inner contour of the second area image being adjacent to the first area image;

compressing the second area image based on compression information to generate a third area image, the compression information being used for indicating a compression mode of the second area image, an inner contour of the third area image being adjacent to the first area image, and a resolution of the third area image being smaller than a resolution of the second area image; and generating a compressed image based on the third area image, and sending the compressed image to a display unit for displaying;

wherein the first area image comprises a transition area, the transition area is located at an inner edge of the first area image, and the method further comprises, before the generating a compressed image based on the third area image:

sampling the transition area to obtain a first transition image and a second transition image, the resolution of the first transition image being larger than the resolution of the second transition image;

mixing the first transition image and the second transition image based on positions of the pixel points of the first transition image and the pixel points of the second transition image in the transition area, to generate a mixed image; and overlaying the mixed image on the transition area.

12. A non-transitory computer readable storage medium storing a computer executable instruction, the computer executable instruction, when executed by a processor, implementing a method for image compression and transmission comprising:

dividing an image to be processed into a first area image and a second area image, the first area image being located at a center of the image to be processed, the second area image surrounding an outer side of the first area image, and an inner contour of the second area image being adjacent to the first area image;

compressing the second area image based on compression information to generate a third area image, the compression information being used for indicating a compression mode of the second area image, an inner contour of the third area image being adjacent to the first area image, and a resolution of the third area image being smaller than a resolution of the second area image; and generating a compressed image based on the third area image, and sending the compressed image to a display unit for displaying;

wherein the first area image comprises a transition area, the transition area is located at an inner edge of the first area image, and the method further comprises, before the generating a compressed image based on the third area image:

sampling the transition area to obtain a first transition image and a second transition image, the resolution of the first transition image being larger than the resolution of the second transition image;

mixing the first transition image and the second transition image based on positions of the pixel points of the first transition image and the pixel points of the second transition image in the transition area, to generate a mixed image; and overlaying the mixed image on the transition area.

13. The electronic device of claim 11, wherein compressing the second area image based on the compression information to generate the third area image comprises:

reading pixel points of the image to be processed line by line to obtain line pixel sequences; and compressing pixel points corresponding to the second area image in respective line pixel sequences based on the compression information, to obtain the third area image.

14. The electronic device of claim 11, wherein the first area image is a rectangle, the second area image comprises four corner areas and at least four edge areas, the four corner areas and the at least four edge areas surround the first area image and are adjacent to the first area image respectively;

compressing the second area image based on the compression information to generate the third area image comprises:

compressing the respective corner areas and the respective edge areas based on the compression information, to obtain compressed corner areas corresponding to the respective corner areas and compressed edge areas corresponding to the respective edge areas;

joining the compressed corner areas and the compressed edge areas based on a position relationship between the respective corner areas and the respective edge areas, to generate a third area image;

generating the compressed image based on the third area image comprises:

joining the first area image and the third area image to generate the compressed image.

15. The electronic device of claim 14, wherein the compression information comprises a target compression coefficient, and the target compression coefficient represents a resolution compression ratio;

compressing the respective corner areas and the respective edge areas based on the compression information, to obtain compressed corner areas corresponding to the respective corner areas and compressed edge areas corresponding to the respective edge areas comprises:

compressing a lateral resolution and a longitudinal resolution of the respective corner areas based on the target compression coefficient, to obtain compressed corner areas corresponding to the respective corner areas; and compressing a resolution of a target direction of the respective edge areas based on the target compression coefficient to obtain compressed edge areas corresponding to the respective edge areas, the target direction being a longitudinal direction of an edge of the edge area opposite to the first area image.

16. The electronic device of claim 14, wherein the compression information comprises at least two target compression arrays, and the target compression arrays comprise a lateral compression coefficient and a longitudinal compression coefficient, the lateral compression coefficient represents a lateral resolution compression ratio, and the longitudinal compression coefficient represents a longitudinal resolution compression ratio;

compressing the respective corner areas and the respective edge areas based on the compression information, to obtain compressed corner areas corresponding to the respective corner areas and compressed edge areas corresponding to the respective edge areas comprises:

compressing the lateral resolution and the longitudinal resolution of the respective corner areas based on the lateral compression coefficient and the longitudinal compression coefficient corresponding to the respective corner areas, to generate compressed corner areas;

compressing the lateral resolution and the longitudinal resolution of the respective edge areas based on the lateral compression coefficient and the longitudinal compression coefficient corresponding to the respective edge areas, to generate unaligned edge areas; and performing zero padding along a target direction of the unaligned edge areas to generate a compressed edge area, the target direction being an extension direction of an edge of the compressed edge area opposite to the first area image.

17. The electronic device of claim 11, wherein the second area image comprises an inner layer area and an outer layer area, wherein an inner contour of the inner layer area is adjacent to the first area image, and an outer contour of the inner layer area is adjacent to an inner contour of the outer layer area; the compression information comprises a first compression coefficient corresponding to the inner layer area and a second compression coefficient corresponding to the outer layer area;

compressing the second area image based on compression information to generate the third area image comprises:

compressing the inner layer area based on the first compression coefficient to obtain the compressed inner layer area;

compressing the outer layer area based on the second compression coefficient to obtain the compressed outer layer area, wherein a resolution of the compressed inner layer area is different from a resolution of the compressed outer layer area; and joining, based on a position relationship between the inner layer area and the outer layer area, the compressed inner layer area and the compressed outer layer area to obtain the third area image, wherein the inner contour of the compressed inner layer area is adjacent to the first area image, and the outer contour of the compressed inner layer area is adjacent to the inner contour of the compressed outer layer area.

18. The electronic device of claim 11, wherein the terminal device comprises a display screen; and dividing the image to be processed into the first area image and the second area image comprises:

collecting visual information, the visual information representing an angle of a visual fixation on the display screen; and dividing the image to be processed into the first area image and the second area image based on the visual information.

* * * * *